US010403004B2

(12) United States Patent
Fenney

(10) Patent No.: US 10,403,004 B2
(45) Date of Patent: Sep. 3, 2019

(54) COMPRESSING BLOCKS OF DATA VALUES BY PERFORMING SPATIAL DECORRELATION ON REORGANIZED BLOCKS

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/155,479

(22) Filed: Oct. 9, 2018

(65) Prior Publication Data

US 2019/0110082 A1  Apr. 11, 2019

(30) Foreign Application Priority Data

Oct. 6, 2017  (GB) .................................. 1716431.0
Oct. 9, 2017  (GB) .................................. 1716471.6

(51) Int. Cl.
*H03M 7/34* (2006.01)
*G06T 9/00* (2006.01)
*H04N 19/91* (2014.01)
*H04N 19/176* (2014.01)
*H04N 19/593* (2014.01)
*H04N 19/136* (2014.01)
(Continued)

(52) U.S. Cl.
CPC .............. *G06T 9/00* (2013.01); *H04N 19/136* (2014.11); *H04N 19/156* (2014.11); *H04N 19/176* (2014.11); *H04N 19/33* (2014.11); *H04N 19/42* (2014.11); *H04N 19/423* (2014.11); *H04N 19/593* (2014.11); *H04N 19/61* (2014.11); *H04N 19/91* (2014.11)

(58) Field of Classification Search
CPC ...... H03M 7/30; H03M 7/46; H03M 13/2707; H03M 13/1102; H03M 7/3062; G06T 9/00; H04N 19/136; H04N 19/156; H04N 19/176; H04N 19/33; H04N 19/42; H04N 19/423; H04N 19/593; H04N 19/61; H04N 19/91
USPC ..................................................... 341/51, 107
See application file for complete search history.

(56) References Cited

U.S. PATENT DOCUMENTS 5,930,466 A * 7/1999 Rademacher .......... G06K 15/10
358/1.15
6,744,929 B1  6/2004 Okada
(Continued)

FOREIGN PATENT DOCUMENTS

GB  2527588 A  12/2015
GB  2528460 A  1/2016
(Continued)

*Primary Examiner* — Linh V Nguyen
(74) *Attorney, Agent, or Firm* — Vorys, Sater, Seymour and Pease LLP; Vincent M DeLuca

(57) ABSTRACT

Data compression (and corresponding decompression) is used to compress blocks of data values involving processes including one or more of color decorrelation, spatial decorrelation, entropy encoding and packing. The entropy encoding generates encoded data values which have variable sizes (in terms of the number of bits). The entropy encoding uses size indications for respective sets of data values to indicate the number of bits used for the encoded data values of the set. The size indications allow the encoded data values to be parsed quickly (e.g. in parallel).

20 Claims, 24 Drawing Sheets

(51) Int. Cl.
*H04N 19/156* (2014.01)
*H04N 19/42* (2014.01)
*H04N 19/33* (2014.01)
*H04N 19/423* (2014.01)
*H04N 19/61* (2014.01)

(56) References Cited

U.S. PATENT DOCUMENTS

| | | | |
|---|---|---|---|
| 9,875,422 B1* | 1/2018 | Lachheb | G06K 9/4642 |
| 2006/0235679 A1* | 10/2006 | Sperschneider | G10L 19/008 |
| | | | 704/206 |
| 2009/0285306 A1* | 11/2009 | Leonardi | H04N 19/46 |
| | | | 375/240.18 |
| 2011/0176607 A1* | 7/2011 | Kim | H04N 19/593 |
| | | | 375/240.08 |
| 2013/0182971 A1* | 7/2013 | Leontaris | G06T 5/002 |
| | | | 382/275 |
| 2013/0272389 A1 | 10/2013 | Sze et al. | |
| 2014/0029864 A1* | 1/2014 | Reif | H04N 19/593 |
| | | | 382/238 |
| 2015/0093024 A1* | 4/2015 | Pajak | G06T 9/00 |
| | | | 382/166 |
| 2015/0215574 A1* | 7/2015 | Hinds | H04N 19/60 |
| | | | 348/441 |
| 2016/0350078 A1* | 12/2016 | Fenney | G06F 7/72 |

FOREIGN PATENT DOCUMENTS

| | | |
|---|---|---|
| GB | 2530312 A | 3/2016 |
| GB | 2545503 A | 6/2017 |
| WO | 2005/050567 A1 | 6/2005 |

* cited by examiner

Clock Cycle

| | C0 | C1 | C2 | C3 | C4 | C5 | C6 | C7 | "C0" C8 |
|---|---|---|---|---|---|---|---|---|---|
| Value input | 0' | 4' | 2' | 1' | 3' | 6' | 5' | 7' | ... |
| Contents of registers at start of clock cycle | ... | 0' | 0' 4' | 0' 4' 2' | 4' 2' | 4' | 4' 6' | 6' | ... |
| Left | | | 0' | 0' | 2' | 4' | 4' | 6' | ... |
| Centre | 0' | 4' | 2' | 1' | 3' | 6' | 5' | 7' | ... |
| Right | | | 0' | 2' | 2' | 4' | 6' | 6' | ... |
| Value output | 0" | 4" | 2" | 1" | 3" | 6" | 5" | 7" | ... |

|  | Clock Cycle | | | | | | | | |
|---|---|---|---|---|---|---|---|---|---|
|  | C0 | C1 | C2 | C3 | C4 | C5 | C6 | C7 | "C0" C8 |
| Value input | 0' | 4' | 1' | 2' | 3' | 5' | 6' | 7' | ... |
| Contents of registers at start of clock cycle | ... | 0' |  | 1' | 1' 2' | 1' 2' 3' | 2' 3' | 3' | ... |
| Left |  | 0' |  |  |  | 1' | 2' | 3' | ... |
| Centre | 0' | 4' | 1' | 2' | 3' | 5' | 6' | 7' | ... |
| Right |  | 0' |  |  |  | 1' | 2' | 3' | ... |
| Value output | 0" | 4" | 1" | 2" | 3" | 5" | 6" | 7" | ... |

COMPRESSING BLOCKS OF DATA VALUES BY PERFORMING SPATIAL DECORRELATION ON REORGANIZED BLOCKS

BACKGROUND

Data compression, both lossless and lossy, is desirable in many applications in which data is to be stored in, and/or read from, a memory. By compressing data before storage of the data in a memory, the amount of data transferred to the memory may be reduced. An example of data for which data compression is particularly useful is image data, such as depth data to be stored in a depth buffer, pixel data to be stored in a frame buffer and texture data to be stored in a texture buffer. These buffers may be any suitable type of memory, such as cache memory, separate memory subsystems, memory areas in a shared memory system or some combination thereof.

A Graphics Processing Unit (GPU) may be used to process image data in order to determine pixel values of an image to be stored in a frame buffer for output to a display. GPUs usually have highly parallelised structures for processing large blocks of data in parallel. There is significant commercial pressure to make GPUs (especially those intended to be implemented on mobile devices) operate at lower power levels. Competing against this is the desire to use higher quality rendering algorithms on faster GPUs, which thereby puts pressure on a relatively limited resource: memory bandwidth. However, increasing the bandwidth of the memory subsystem might not be an attractive solution because moving data to and from, and even within, the GPU consumes a significant portion of the power budget of the GPU. The same issues may be relevant for central processing units (CPUs) as well as GPUs.

As described above, one way to reduce the amount of data transferred to the memory is to compress the data that is to be transferred to and from the memory. The time taken for data to be compressed and decompressed adds to the latency of the memory read and write operations and therefore may affect the speed at which the GPU operates. Furthermore, the rate at which data is compressed may be permitted to differ from the rate at which that compressed data is decompressed. As an example, the compression process for compressing texture data (which is typically a lossy compression process) may often be permitted to be significantly slower than the decompression process for decompressing the compressed texture data. In contrast the compression processes for compressing depth data for storage in a depth buffer or pixel data for storage in a frame buffer (which are typically lossless compression processes) ideally should be performed at approximately the same rate as the corresponding decompression processes. UK patent number 2451911 discloses a graphics rendering system which can compress a two-dimensional data set.

Variable length encoding schemes allow data to be compressed in a manner such that some portions of data can be represented by fewer encoded bits than other portions of data, with the aim of providing high levels of compression (which may differ) across the different portions of data. However, allowing the number of bits used to represent different encoded data values to vary increases the complexity of decoding the encoded data quickly. For example, without analysing the encoded data (e.g. decoding each of the encoded data values in sequence) it can be difficult to determine where the boundaries between different encoded data values lie.

UK patent number 2530312 describes a data compression system in which 8×8 blocks of image data are compressed by performing colour decorrelation, spatial decorrelation and entropy encoding, and then packing the resulting encoded data values into data packets for storage. In the system described in that patent, a row of data values from a block is processed per iteration. A modified version of Exponential Golomb coding is used for the entropy encoding wherein each coefficient stored a prefix to indicate a range of values that were then identified by a suffix. Having a prefix and suffix for each encoded coefficient makes decoding multiple values simultaneously difficult because it is not simple to quickly determine the positions of the boundaries between encoded bits.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In examples described herein entropy encoding is performed on sets of data values (e.g. 2×2 sets of data values). For each set of data values an indication is included in an encoded output (e.g. in a header section thereof) to indicate how many bits are used for each of the encoded data values representing the set of data values. The encoded data values are then included in the encoded output in accordance with the indicated numbers of bits. This system means that the decoding of the encoded data values is simplified (compared to the system of UK patent number 2530312) because a simple read of the indications (e.g. in the header) allows the bit boundaries between different encoded data values to be determined. In other words the indications allow the sizes of the corresponding encoded data sections to be quickly determined (e.g. in just a single clock cycle).

There is provided a method of performing spatial decorrelation on a j×k input block of data values using a spatial decorrelation module which is arranged to process g×h blocks of data values, wherein the number of columns, j, in the input block of data values is a multiple of g, and wherein j×k=g×h, the method comprising:

reorganising the input block of data values into a g×h block of data values by: (i) dividing each of the rows of the input block into a plurality sections, wherein each section comprises g data values, and (ii) arranging the sections into h rows to form a g×h block of data values; and performing spatial decorrelation on the g×h block of data values, wherein the rows of the g×h block of data values are processed in an order such that, for each row of the input block of data values, a first section of that row is processed in an earlier iteration to that in which a second section of that row is processed, wherein the first section is to the right of the second section in the row, and wherein at least one value from the first section is saved for use in the spatial decorrelation of the second section.

For example, g=h=8, such that the g×h block of data values is an 8×8 block of data values. Furthermore, in some examples, j=16 and k=4, such that each of the rows of the input block is divided into two sections. In other examples, j=32 and k=2, such that each of the rows of the input block is divided into four sections.

There is provided a data compression unit configured to perform spatial decorrelation on a j×k input block of data values, the data compression unit comprising:

processing logic configured to reorganise the input block of data values into a g×h block of data values by: (i) dividing each of the rows of the input block into a plurality sections, wherein each section comprises g data values, and (ii) arranging the sections into h rows to form a g×h block of data values, wherein the number of columns, j, in the input block of data values is a multiple of g, and wherein j×k=g×h; and a spatial decorrelation module configured to perform spatial decorrelation on the g×h block of data values, the h rows of the g×h block of data values being processed in an order such that, for each row of the input block of data values, a first section of that row is processed in an earlier iteration to that in which a second section of that row is processed, wherein the first section is to the right of the second section in the row, and wherein at least one value from the first section is saved for use in the spatial decorrelation of the second section.

The processing logic may, or may not, be part of the spatial decorrelation module.

There is provided a method of performing spatial recorrelation on a g×h input block of data values and outputting a j×k output block of spatially recorrelated data values, wherein the number of columns, j, in the output block of data values is a multiple of g, wherein j×k=g×h, and wherein j≠g, the method comprising:

performing spatial recorrelation on the g×h input block of data values, wherein the rows of the g×h input block of data values correspond to sections of rows of the j×k output block of data values, and wherein the rows of the input block of data values are processed in an order such that a first row of the input block of data values corresponding to a first section of a particular row of the output block is processed in an earlier iteration to that in which a second row of the input block of data values corresponding to a second section of the particular row of the output block is processed, wherein the first section is to the right of the second section in the particular row of the output block, and wherein at least one value from the first row of the input block of data values is saved for use in the spatial recorrelation of the second row of the input block of data values;

reorganising the spatially recorrelated data values into the j×k output block of spatially recorrelated data values by arranging the rows of spatially recorrelated data values into their corresponding sections in the k rows of the output block; and outputting the j×k output block of spatially recorrelated data values.

There is provided a data decompression unit comprising:

a spatial recorrelation module configured to perform spatial recorrelation on a g×h input block of data values to determine a j×k output block of spatially recorrelated data values, wherein the number of columns, j, in the output block of data values is a multiple of g, wherein j×k=g×h, and wherein j≠g, wherein the rows of the g×h input block of data values correspond to sections of rows of the j×k output block of data values, and wherein the spatial recorrelation module is configured to process the rows of the input block of data values in an order such that a first row of the input block of data values corresponding to a first section of a particular row of the output block is processed in an earlier iteration to that in which a second row of the input block of data values corresponding to a second section of the particular row of the output block is processed, wherein the first section is to the right of the second section in the particular row of the output block, and wherein the spatial recorrelation module is configured to save at least one value from the first row of the input block of data values for use in the spatial recorrelation of the second row of the input block of data values; and processing logic configured to reorganise the spatially recorrelated data values into the j×k output block of spatially recorrelated data values by arranging the rows of spatially recorrelated data values into their corresponding sections in the k rows of the output block.

There are a number of different components described herein, including an entropy encoding module, a data compression unit, an entropy decoding module and a data decompression unit. Any of these components may be embodied in hardware on an integrated circuit. There may be provided a method of manufacturing, at an integrated circuit manufacturing system, any of the components. There may be provided an integrated circuit definition dataset that, when processed in an integrated circuit manufacturing system, configures the system to manufacture any of the components. There may be provided a non-transitory computer readable storage medium having stored thereon a computer readable description of any of the components that, when processed in an integrated circuit manufacturing system, causes the integrated circuit manufacturing system to manufacture an integrated circuit embodying the component.

There may be provided an integrated circuit manufacturing system comprising: a non-transitory computer readable storage medium having stored thereon a computer readable description of any of the components; a layout processing system configured to process the computer readable description so as to generate a circuit layout description of an integrated circuit embodying the component; and an integrated circuit generation system configured to manufacture the component according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 23c illustrates the distribution of data values after a signed right shift by 2 bits has been applied to the data values shown in FIG. 23a;

Figure 1:
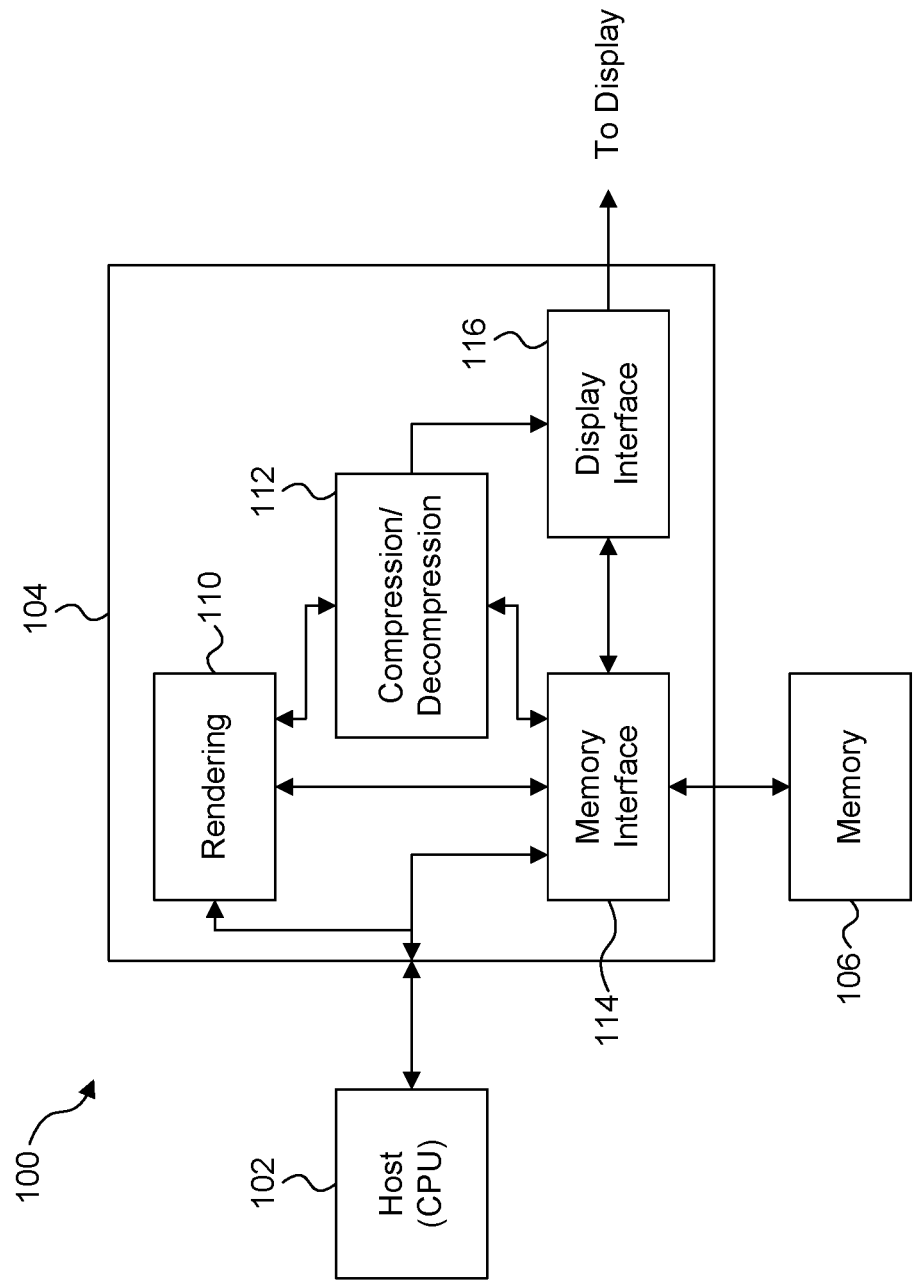
FIG. 1 shows a graphics rendering system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Data compression is useful in a variety of different scenarios. Most of the examples described herein relate to the compression (and decompression) of image data for use by a GPU, but similar principles could be applied to the compression (and decompression) of other types of data such as audio or numeric data and/or for use by a processing unit other than a GPU, such as a CPU.

FIG. 1 shows a graphics rendering system 100 which may be implemented in an electronic device, such as a mobile device. The graphics rendering system 100 comprises a host CPU 102, a GPU 104 and a memory 106 (e.g. a graphics memory). The CPU 102 is arranged to communicate with the GPU 104. Data, which may be compressed data, can be transferred, in either direction, between the GPU 104 and the memory 106.

The GPU 104 comprises a rendering unit 110, a compression/decompression unit 112, a memory interface 114 and a display interface 116. The system 100 is arranged such that data can pass, in either direction, between: (i) the CPU 102 and the rendering unit 110; (ii) the CPU 102 and the memory interface 114; (iii) the rendering unit 110 and the memory interface 114; (iv) the memory interface 114 and the memory 106; (v) the rendering unit 110 and the compression/decompression unit 112; (vi) the compression/decompression unit 112 and the memory interface 114; and (vii) the memory interface 114 and the display interface. The system 100 is further arranged such that data can pass from the compression/decompression unit 112 to the display interface 116. Images which are rendered by the GPU 104 may be sent from the display interface 116 to a display for display thereon.

In operation, the GPU 104 processes image data. For example, the rendering unit 110 may perform scan conversion of graphics primitives, such as triangles and lines, using known techniques such as depth-testing (e.g. for hidden surface removal) and texturing and/or shading. The rendering unit 110 may contain cache units to reduce memory traffic. Some data is read or written by the rendering unit 110, to the memory 106 via the memory interface unit 114 (which may include a cache) but for other data, such as data to be stored in a frame buffer, the data preferably goes from the rendering unit 110 to the memory interface 114 via the compression/decompression unit 112. The compression/decompression unit 112 reduces the amount of data that is to be transferred across the external memory bus to the memory 106 by compressing the data, as described in more detail below.

The display interface 116 sends completed image data to the display. An uncompressed image may be accessed directly from the memory interface unit 114. Compressed data may be accessed via the compression/decompression unit 112 and sent as uncompressed data to the display 108.

In alternative examples the compressed data could be sent directly to the display 108 and the display 108 could include logic for decompressing the compressed data in an equivalent manner to the decompression of the compression/decompression unit 112. Although shown as a single entity, the compression/decompression unit 112 may contain multiple parallel compression and/or decompression units for enhanced performance reasons.

As a general overview, a compression system may follow a basic algorithmic outline, such that the following steps are performed (not necessarily in the order given below):

1. Division into Blocks

The image data is logically divided into independent, non-overlapping, rectangular blocks in order to permit random access to the compressed data. The size and shape of the blocks is implementation dependent and the blocks may, for example, be 8×8, 16×4, 32×2, 4×4 or 32×16 blocks of data values. Increasing the block size tends to improve the compression ratio that is achieved. However, increasing block size also tends to incur greater hardware costs and, furthermore, may have decreased efficiency when access patterns become less coherent. So there is a balance to be struck when selecting the block size, which is implementation dependent and which may, for example, depend upon characteristics of the type of data that is to be compressed.

2. Format Conversion

Some buffers, e.g. the depth buffer, may store data in floating-point format, but performing lossless arithmetic on floating-point numbers can be problematic. Therefore, the floating-point values may be interpreted as signed magnitude integer values to permit lossless calculations. Format conversion may also be used where the data values comprise a plurality of channels representing data of different colour components, wherein the values in the channels are not multiples of 8 bits, e.g. RGB5:6:5 or ARGB2:10:10:10 formats. The format of the data values may be converted so that each channel has values which are multiples of 8 bits (e.g. ARGB 8:8:8:8 format). The format conversion step is not always included in the compression process, e.g. when the data is already in an integer format, or some other format on which lossless arithmetic can be performed.

3. Colour Channel Decorrelation

The data values may comprise a plurality of channels representing data of different colour components. For example, the data may be in ARGB 8:8:8:8 format, where there are 8-bits to represent each of the Alpha, Red, Green and Blue channels of each of the data values. There is frequently considerable correlation between the values of some or all of the colour channels (e.g. the R, G and B channels), and a compression algorithm can take advantage of this correlation to compress the data by, on average, reducing the range of some of the channels. Suitable colour space transforms for exploiting the correlation between the different colour channels are known in the art, for example as described in GB2451911, and are not described in detail herein. Suitable colour space transforms are lossless and "non-expanding" meaning that the number of bits used to represent a colour value does not increase due to the colour space transform.

4. Spatial Decorrelation

Spatial decorrelation (also referred to as 'prediction') removes some of the correlation between nearby pixels, thereby reducing, on average, the dynamic ranges of the values. A method for performing spatial decorrelation is described below in detail with reference to FIGS. 6 to 10.

5. Entropy Encoding

Entropy encoding makes use of the statistical properties of the decorrelated data to reduce the number of bits used to represent the data. Arithmetic coding schemes are relatively computationally intensive and slow. Therefore, relatively simple Variable Length Coding (VLC) (e.g. Huffman or Golomb-Rice) or Run-Length based entropy encoding schemes have been used. However, it can be difficult to perform entropy decoding at high speeds even with the simple VLC encoding schemes. A new method for performing entropy encoding and decoding at high speed and with low computational complexity is described below in detail.

6. Storage

Finally, the compressed data may be stored in the memory 106. The details of the mechanism for storing data in the memory 106 will be known to those skilled in the art, and as such are not described in great detail herein.

A decompression system may follow the reverse of the basic algorithmic outline given above for compression (not necessarily in the reverse of the order given above).

Figure 2:
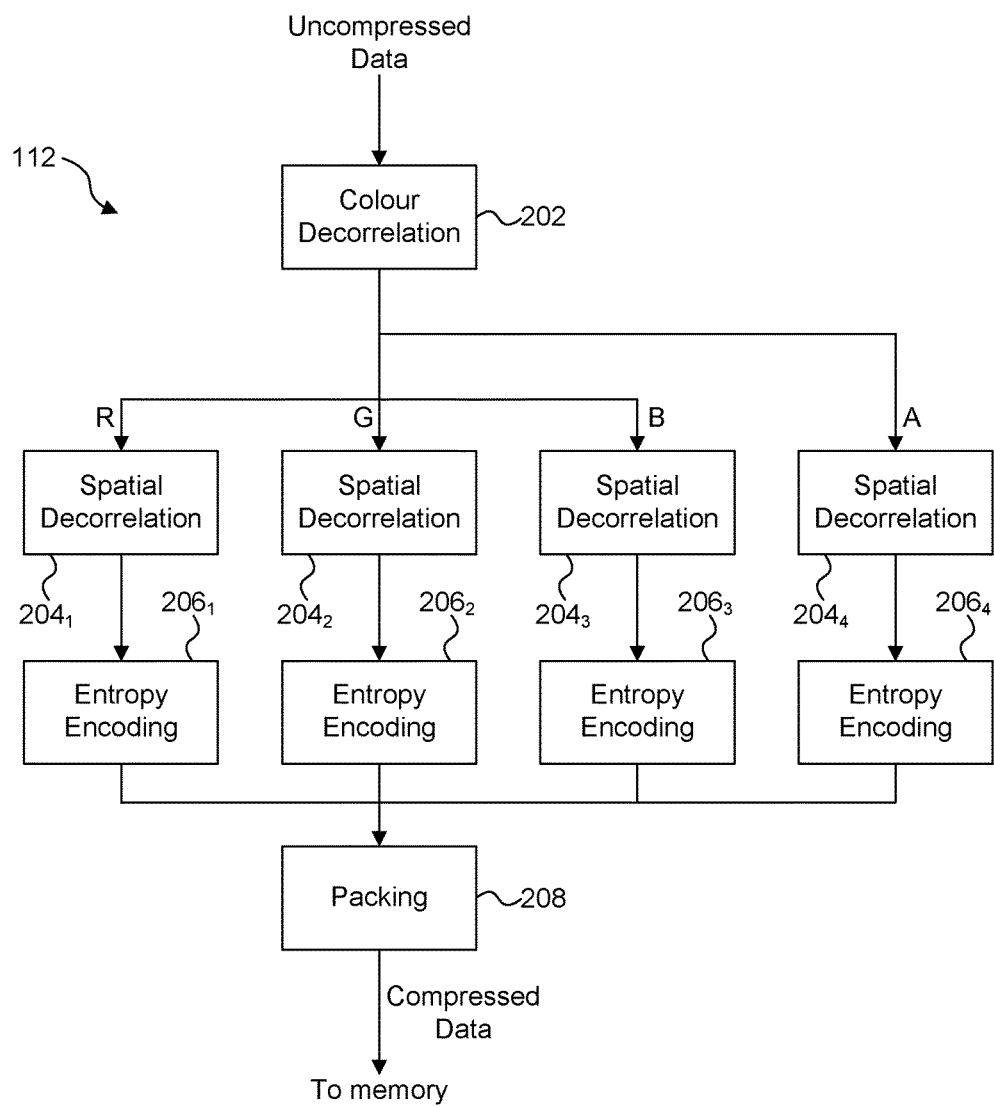
FIG. 2 shows a data compression unit.

The general compression algorithm given above may be applied in the compression/decompression unit 112. FIG. 2 shows modules of the compression/decompression unit 112 which are to be used to compress a block of ARGB data values which comprise four 8-bit channels, when the compression/decompression unit 112 is operating as a compression unit. In other examples the compression/decompression unit 112 may be used to compress blocks of data values which have other formats. The compression unit 112 comprises a colour decorrelation module 202, four spatial decorrelation modules $204_1$ to $204_4$, four entropy encoding modules $206_1$ to $206_4$ and a packing module 208.

Figure 3:
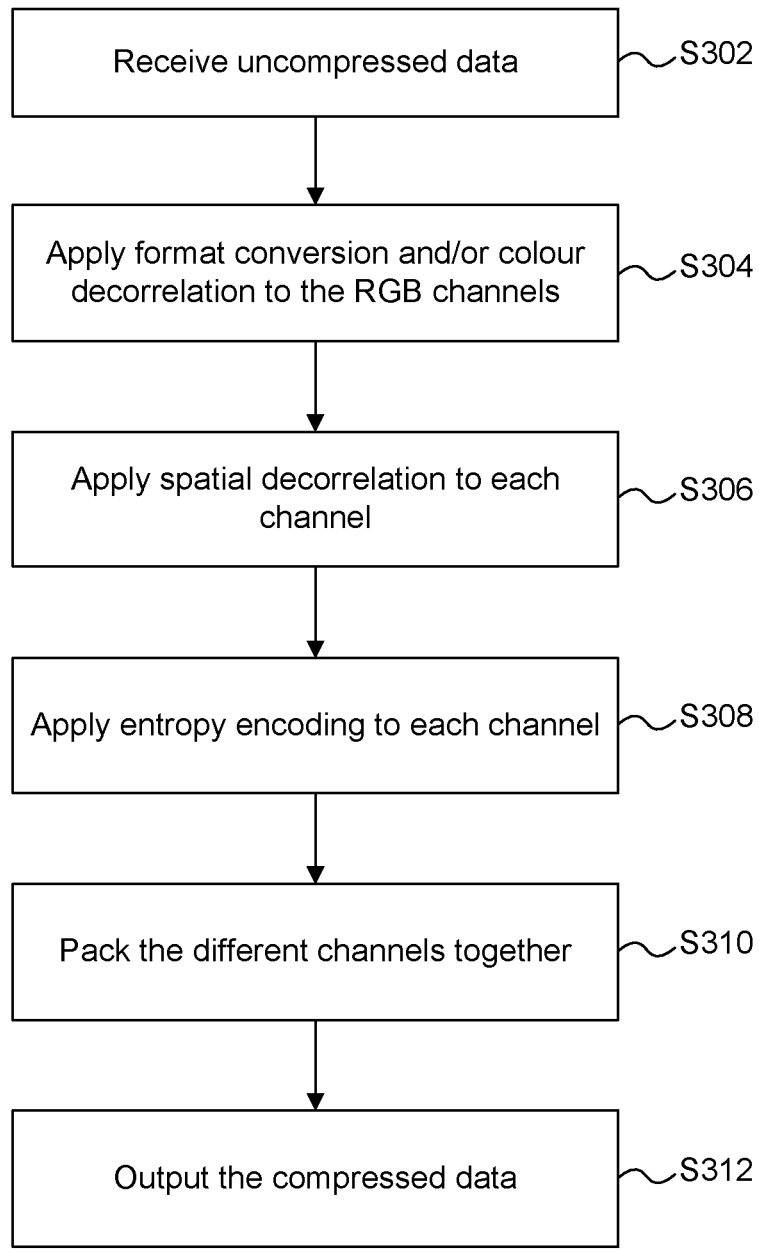
FIG. 3 shows a flow chart for a method of compressing data.

FIG. 3 shows a flow chart for a method of compressing a block of data, which may for example be an 8×8 block of pixel data wherein there are 32 bits per pixel, in ARGB 8:8:8:8 format. That is, in this example, each data value in the 8×8 block comprises 32 bits: 8 bits for the Alpha channel, 8 bits for the Red channel, 8 bits for the Green channel and 8 bits for the Blue channel. In step S302 a block of uncompressed data is received at the compression unit 112. The first step of the general compression algorithm given above, i.e. the division into blocks, may be performed on the data before it is received at the compression unit 112. Alternatively, this step may be performed at the compression unit 112. The uncompressed data is received at the colour decorrelation module 202. In step S304 the colour decorrelation module 202 may apply the format conversion to the data values as described above. It is noted that the format conversion step might not be implemented, e.g. when the data is already in a suitable format (such as in an integer format), such that no format conversion is necessary.

In step S304 the colour decorrelation module 202 applies colour decorrelation to the data values. Suitable colour decorrelation methods are known in the art. Preferably, a colour decorrelation method is used which does not expand any of the output channels, i.e. the number of bits output from the colour correlation module 202 is not greater than the number of bits input to the colour decorrelation module 202.

In other examples, the data values of the Alpha channel are sent to the spatial decorrelation module $204_4$, and the data values of the R, G and B channels are sent to the colour decorrelation module 202, such that the colour decorrelation module 202 applies the colour decorrelation only to the R, G and B values.

It has been found (e.g. as shown in GB2451911) that the following, remarkably simple, colour transform performs well for 8-bit colour values:

$R' = R - G \mod 2^8$ $G' = G$ $B' = B - G \mod 2^8$ $A' = A$ where R, G, B and A are the data values of the channels received at the colour decorrelation module 202 and R', G', B' and A' are the data values of the decorrelated colour channels output from the colour decorrelation module 202.

The distribution of the transformed channels, R' and B', is not dissimilar to a (bounded) Laplace distribution function centred on zero. Performing the modulo operation in the transforms shown above reduces the dynamic range of the distribution such that fewer bits can be used than if the values of R-G and B-G were used without performing the modulo operations. It is noted that the modulo operation given above is mod $2^8$ because each data value in the channels comprises 8 bits in the example given above. In other examples, each data value may have a different number of bits, e.g. n bits, in which case the modulo operation would be changed accordingly, e.g. to be mod $2^n$.

The colour-decorrelated values of the Red, Green, Blue and Alpha channels are output from the colour decorrelation module 202 and split from each other in order to be passed to the respective spatial decorrelation modules $204_1$, $204_2$, $204_3$ and $204_4$. In step S306 the spatial decorrelation modules 204 each apply spatial decorrelation to a block of data values of the respective colour channels to thereby remove a significant portion of the correlation between pixels in the block. The selection of a spatial decorrelation method should consider a trade-off between relevant factors, such as the reduction in spatial correlation that can be achieved, the complexity and/or the latency of the operations involved in the spatial decorrelation and the complexity and/or the latency of the operations involved in recorrelating the spatially decorrelated values. An example of the spatial decorrelation applied by each of the spatial decorrelation modules 204 is described in more detail below with reference to FIGS. 6 to 9.

The spatially decorrelated data values are output from each of the spatial decorrelation modules $204_1$ to $204_4$ and are provided to the corresponding entropy encoding modules $206_1$ to $206_4$. In step S308 the entropy encoding modules 206 apply entropy encoding to the data values. The entropy encoding is performed according to a variable-length coding (VLC) scheme, such that the entropy encoded values will most likely not all have the same number of bits. In general, more probable values are encoded with fewer bits. In this way, it is likely that the total number of bits used to encode all of the data values in a data block will be reduced by the entropy encoding. There are some situations where spatial decorrelation can expand data, and these situations can be treated as special cases (i.e. the data is treated differently to other cases) in order to limit the expansion.

VLC encoding can be reasonably straightforward to perform at a high rate, but VLC decoding at a matching rate can be significantly more difficult because the bit-boundaries between contiguously stored encoded data values are not known until the encoded data is analysed, i.e. the length of the encoded data values is not known until the encoded data is analysed. In particular, when encoding, multiple symbols can be mapped independently to their corresponding codes and code lengths, and then merged into a contiguous output bit stream. However, typically when decoding, each code in the encoded bit stream is examined sequentially in order to determine its length which, in turn, determines the location of the start of the next code. In other words, the bit-boundaries between the different encoded data values need to be found. An example of the entropy encoding applied by each of the entropy encoding modules 206 is described in more detail below with reference to FIGS. 11 to 13.

The entropy encoded data values are output from each of the entropy encoding modules 206 and are provided to the packing module 208. In step S310 the packing module packs the encoded data values from the different channels together into a compressed data block in accordance with a packing scheme. In step S312 the packed data values are output from the packing module 208 as compressed data. The compressed data may be sent to the memory 106 (e.g. via the memory interface 114) for storage therein.

The steps shown in FIG. 3 are iterated for different blocks of data values. For example, the entropy encoding could be performed in parallel for each of the data values in a block (e.g. an 8×8 block) of data values; whereas the spatial decorrelation may be performed in a manner such that a row of data values are processed per iteration. It simplifies the system if the entropy encoding and the spatial decorrelation operate at the same rate, so in examples described herein both operate at the (average) rate of a row of data values per iteration. Encoding can be performed on all four channels in parallel, with each channel encoding a row of data values per iteration. The iterations may be performed on respective consecutive clock cycles. Therefore, as an example, where there are eight data values in a row of the block, eight data values may be compressed per clock cycle.

Figure 4:
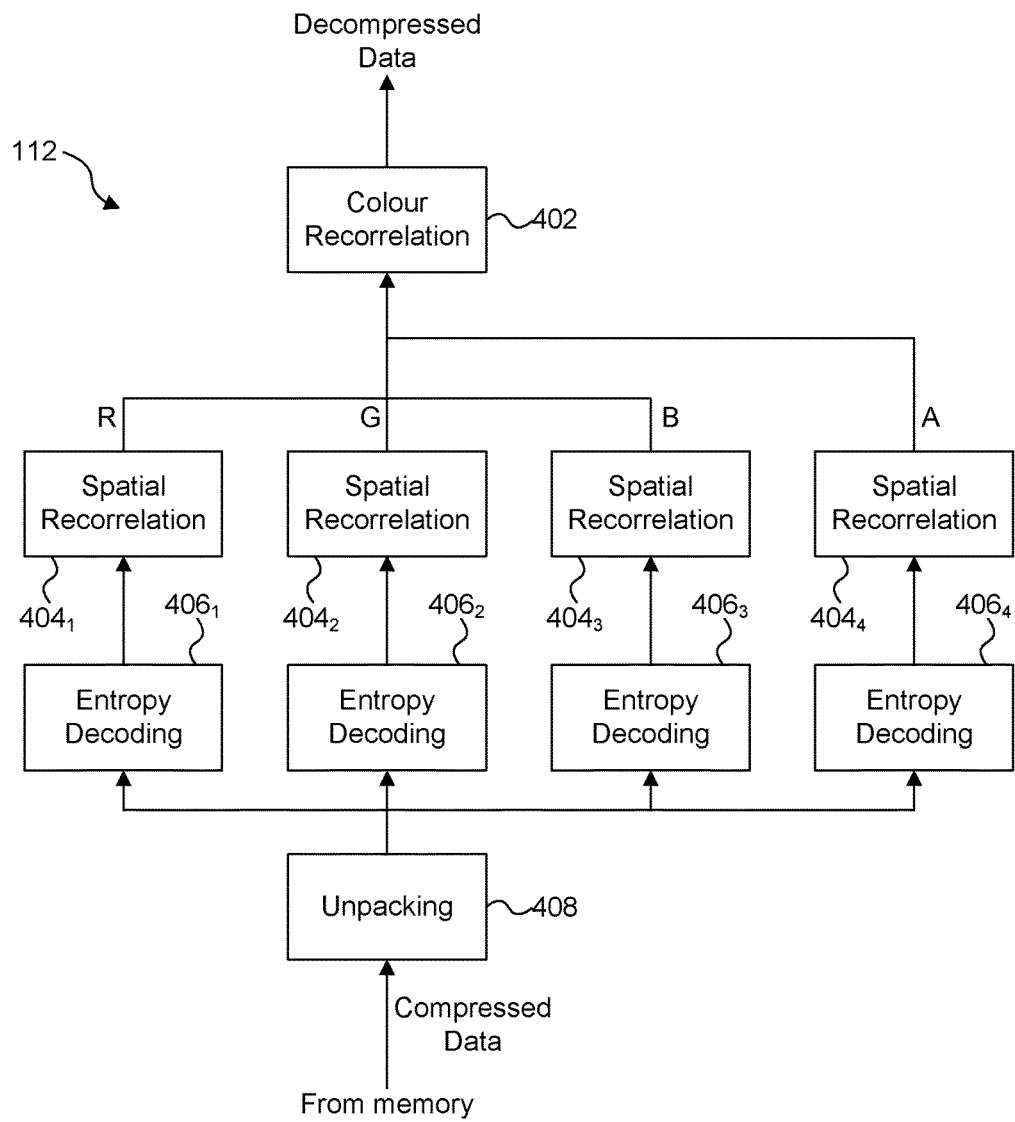
FIG. 4 shows a data decompression unit.

FIG. 4 shows modules of the compression/decompression unit 112 which are to be used to decompress a block of ARGB data values, when the compression/decompression unit 112 is operating as a decompression unit. The decompression unit 112 comprises a colour recorrelation module 402, four spatial recorrelation modules $404_1$ to $404_4$, four entropy decoding modules $406_1$ to $406_4$ and an unpacking module 408.

Figure 5:
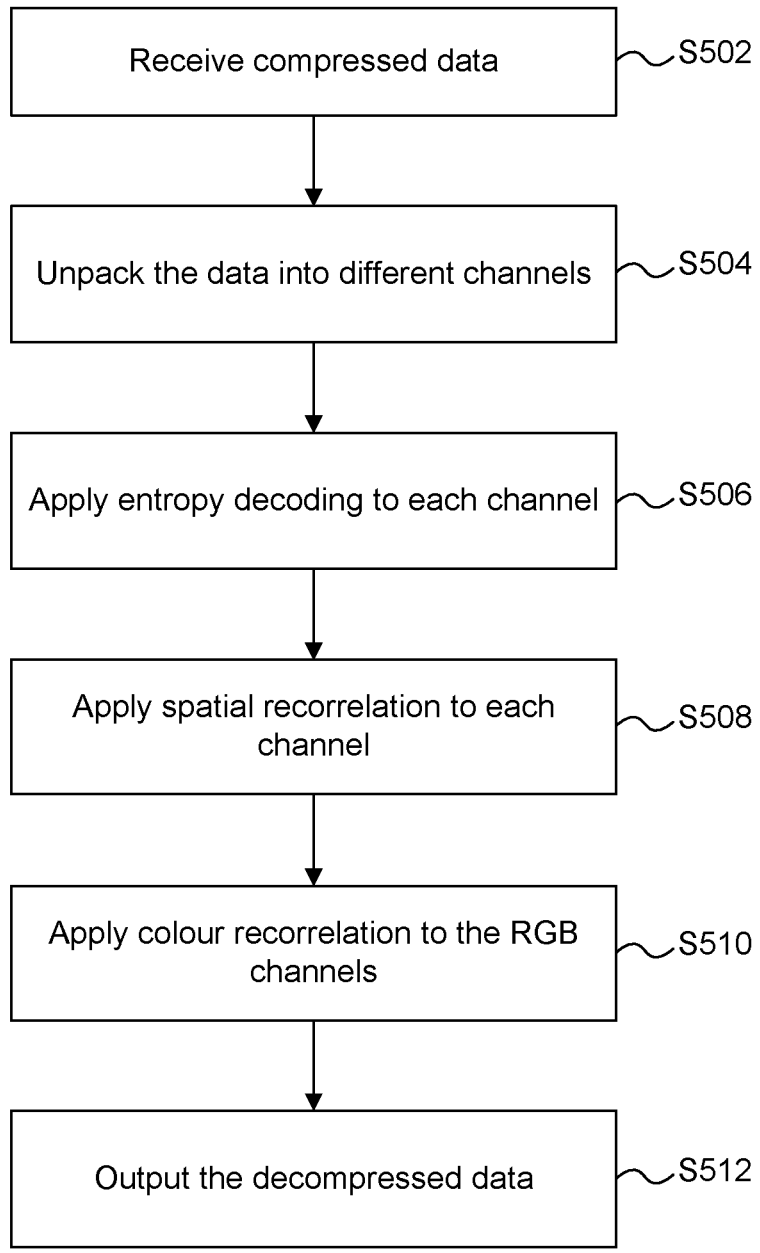
FIG. 5 shows a flow chart for a method of decompressing data.

FIG. 5 shows a flow chart for a method of decompressing a block of data. In step S502 compressed data for a block is received in a data packet at the unpacking module 408 of the decompression unit 112 from the memory 108 (e.g. via the memory interface 114). The compressed data has been compressed using the method described above in relation to FIGS. 2 and 3. In step S504 the compressed data values within a data packet are unpacked into different channels. In this example, the different channels are for the different colour components (e.g. Red, Green, Blue and Alpha channels), whereas in other examples the different channels may represent other things, e.g. the different channels may represent components of normal vectors or the separate parts of larger data values (e.g. 32-bit data values representing depth and/or stencil data). The compressed data is unpacked in accordance with an unpacking scheme which corresponds to the packing scheme used to pack the data values into a compressed data block in step S310. As described below, the encoded data includes indications in specified regions within the data packet (e.g. in header regions) which indicate the numbers of bits which are used for the encoded data values. Therefore these indications can be read in order to determine how many bits are included in the encoded data for each of the channels within a data packet. In order to unpack the incoming data into the appropriate channels, the unpacking module 408 separates the encoded data inputs within a data packet into respective colour channels based on the numbers of bits forming the encoded data values, as indicated by the indications in the encoded data input. For example, the unpacking module may determine the length of each of the encoded data inputs corresponding to the respective colour channels in a data packet, in a single clock cycle, by reading the indications and adding the indicated numbers of bits. The encoded data values (i.e. the compressed data) for the different channels are provided to respective ones of the entropy decoding modules 406.

In step S506 each of the entropy decoding modules 406 applies entropy decoding to the encoded data values. The entropy decoding is performed in accordance with the variable-length coding (VLC) scheme that was used in step S308 to encode the data values. An example of the entropy decoding applied by each of the entropy decoding modules 406 is described in more detail below with reference to FIGS. 17 and 18.

The entropy decoded data values are output from the entropy decoding modules $406_1$ to $406_4$ and are provided to the corresponding spatial recorrelation modules $404_1$ to $404_4$. In step S508 the spatial recorrelation modules 404 each apply spatial recorrelation to the entropy decoded data values of the respective colour channels. In this way the spatial decorrelation that was applied to the data values in step S306 is reversed.

The data values of the R, G, B and A channels are sent to the colour recorrelation module 402. In step S510 the colour recorrelation module 402 applies colour recorrelation to the data values of the R, G, B and A channels. The colour recorrelation method is chosen to be the reverse of the colour decorrelation method used in step S304 described above. In some other examples, the alpha channel might bypass the colour recorrelation module 402, e.g. if it is not needed for the colour recorrelation.

Following step S510 the data values for each of the channels (e.g. R, G, B and A channels) have been decompressed, and in step S512 these data values are output as the decompressed data. The decompressed data may be output to any other element in the device. The decompressed data may be used in any suitable manner, for example, if the data is image data, the decompressed data may be output to the display interface 116 for output to the display 108. In other examples, the data may be used as a source for a video compositor or as a texture in a 3D render.

The steps shown in FIG. 5 are iterated for different blocks of data values. For example, the entropy decoding could be performed in parallel for each of the data values in a block (e.g. an 8×8 block) of data values; whereas the spatial recorrelation may be performed in a manner such that a row of data values are processed per iteration. It simplifies the system if the entropy decoding and the spatial recorrelation operate at the same rate, so in examples described herein both operate at the (average) rate of a row of data values per iteration. The iterations may be performed on respective consecutive clock cycles. Therefore, as an example, where there are eight data values in a row of the block, eight data values may be decompressed per clock cycle. When there are multiple channels of data, those channels may be decompressed independently (in parallel), with each channel decoding a row of data values per iteration. For example, an ARGB system might decompress 32 (i.e. 4×8) data values per clock cycle.

It can be useful to allow a predictable number of data values to be compressed and/or decompressed in each clock cycle. This is not necessarily trivial when variable-length entropy coding is used and/or when 2D spatial decorrelation is to be performed. Furthermore, the ability to compress and decompress multiple data values (e.g. eight data values) on each clock cycle allows the compression and decompression of blocks of data to be performed quickly, i.e. with reduced latency, compared to other compression or decompression methods which cannot compress and/or decompress as many data values in each clock cycle.

Examples showing how the spatial decorrelation and the entropy encoding/decoding modules can achieve the compression/decompression rates mentioned above are described below.

Figure 6:
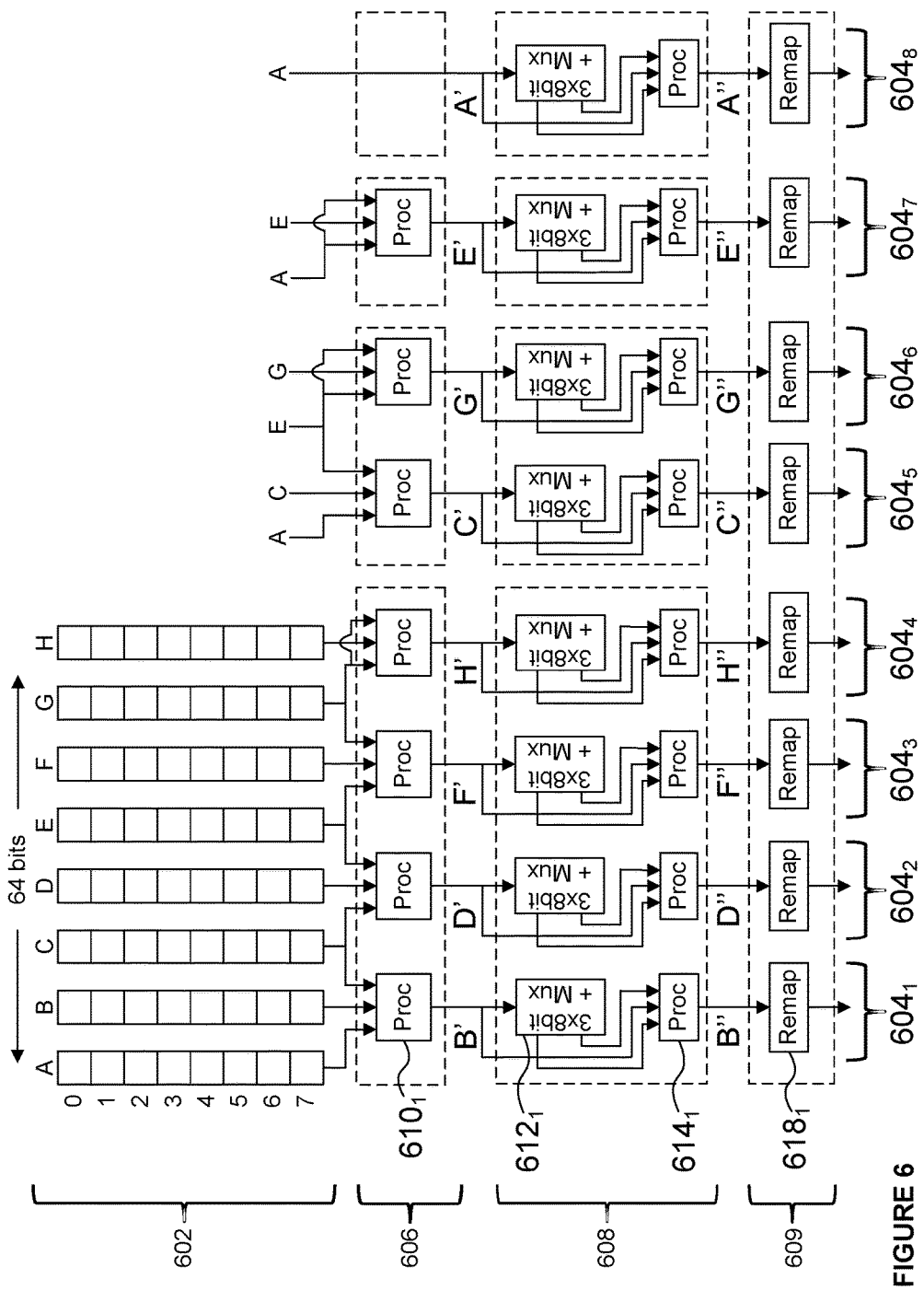
FIG. 6 shows a spatial decorrelation module.

FIG. 6 shows one of the spatial decorrelation modules 204 which may be implemented in any one of the data channels. It is noted that in the examples described herein the data channels are colour channels, but in other examples the data channels might not be colour channels and may instead be other types of data channels. In the example shown in FIG. 6, an 8×8 block of data values 602 for the channel is received at the spatial decorrelation module 204. The data values in the data block 602 are arranged into a two dimensional array of eight rows (labelled 0 to 7 in FIG. 6) and eight columns (labelled A to H in FIG. 6). A block of data values relates to a respective block of adjacent pixel values. Each of the data values comprises 8 bits in the example shown in FIG. 6 such that each row of the data block comprises 64 bits. The spatial decorrelation module 204 is configured to process the rows of the data block on respective consecutive clock cycles to thereby perform spatial decorrelation in two dimensions on the data values from the block.

The spatial decorrelation module 204 comprises a plurality of parallel processing pipelines ($604_1$ to $604_8$) each comprising a first stage 606, a second stage 608 and a remapping stage 609. The first stages 606 of the processing pipelines 604 are configured to implement spatial decorrelation along rows of data values. The first stages 606 of all of the processing pipelines 604 except for the last processing pipeline $604_8$ comprise a processing unit 610 which is configured to determine a first coefficient to represent a respective one of the data values from a row that is being processed. The second stages 608 of the processing pipelines 604 are configured to implement spatial decorrelation along columns of data values. The second stage 608 of each of the processing pipelines 604 comprises a storage unit (e.g. a register 612) and a processing unit 614. In the example shown in FIG. 6, the registers 612 have sufficient capacity to store at least three of the data values, which for example each have eight bits. The remapping stage 609 of the processing pipelines 604 comprises remapping units 618 which are configured to remap the data values into values that are more suitable for entropy encoding. In the example described herein, the top left value (A0″) is remapped, but it would be possible not to remap the top left value (A0″) because that value is not entropy encoded in the system described herein. It is noted that in FIG. 6 the processing unit $610_1$, the register $612_1$, the processing unit $614_1$ and the remapping unit $618_1$ are labelled for the first processing pipeline $604_1$, but for clarity the corresponding processing units $610_n$, registers $612_n$, processing units $614_n$ and remapping units $618_n$ are not labelled in FIG. 6 for the other processing pipelines $604_n$ (where $2 \leq n \leq 8$).

Figure 9:
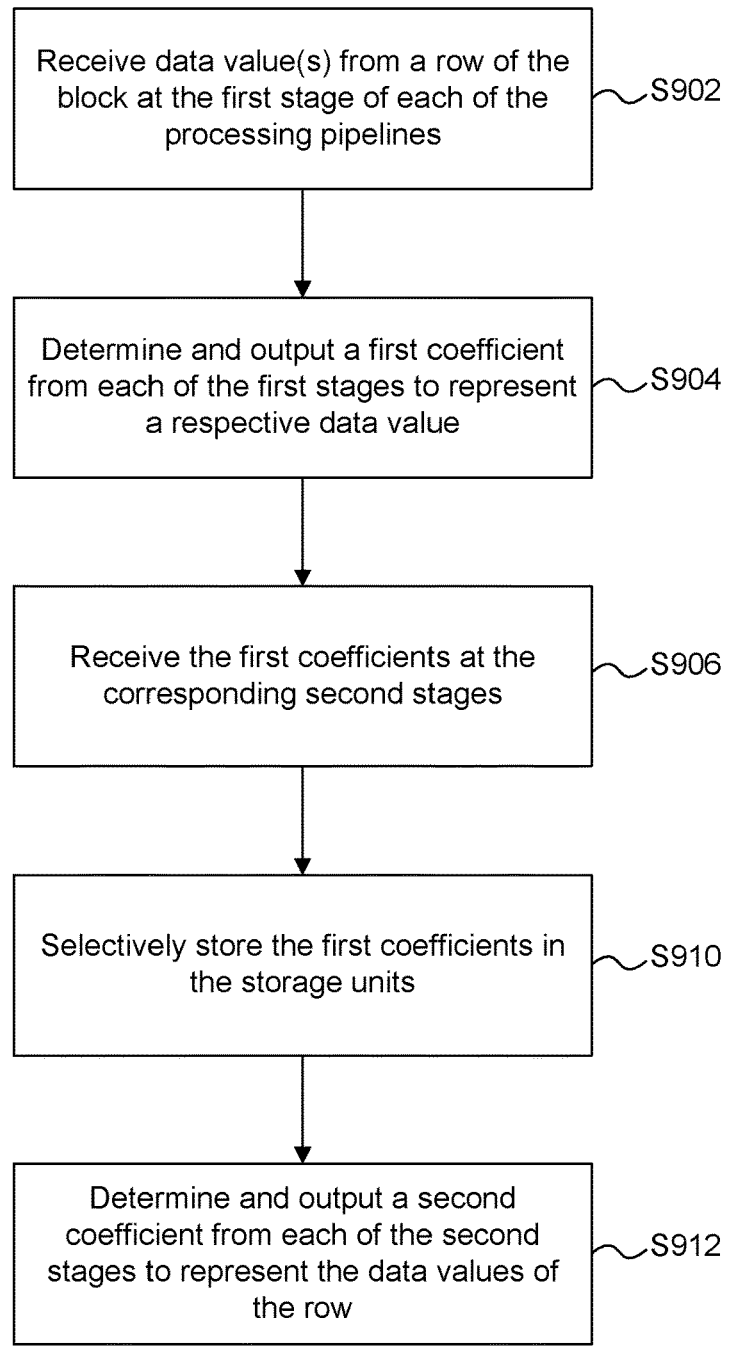
FIG. 9 shows a flow chart for a method of performing spatial decorrelation on a block of data values.

FIG. 9 shows a flow chart for a process of performing two dimensional (2D) spatial decorrelation on the block of data values 602 at the spatial decorrelation module 204. In operation, in step S902 the data values from a row (e.g. row 0) of the data block 602 are received. In particular, each of the processing pipelines 604 is configured to receive one or more of the data values from a particular row of the data block. In the example shown in FIG. 6 the processing units 610 of the first stages of the processing pipelines $604_1$ to $604_7$ receive more than one of the data values from a particular row of the data block 602, but the first stage of the processing pipeline $604_8$ receives just one of the data values from a particular row of the data block 602. In step S904, each of the first stages 606 determine a first coefficient which represents a respective one of the data values of the particular row. The first coefficients are determined by the processing units 610 of the processing pipelines $604_1$ to $604_7$ based on the data values received at the processing units 610 in step S902, and according to any suitable prediction scheme, such as a scheme based on Linear prediction or based on Haar prediction. The first stage 606 of the last processing pipeline $604_8$ simply determines the first coefficient to be the same as the data value received thereat.

In each of the first stages of the processing pipelines $604_1$ to $604_7$, in order to determine a first coefficient to represent a data value, a prediction of the data value is determined using other data values, and then the first coefficient is based on the difference between the received data value and the prediction of the data value. Provided the prediction is sufficiently accurate, the distribution of first coefficient values (e.g. the differences between each actual data value and the prediction value) is generally more biased (towards zero) than the distribution of the actual data values themselves, and can on average be represented using fewer bits. The first coefficients, when considered as signed values, may often be equal to, or nearly equal, to zero.

The Linear or Haar prediction schemes may include a two stage process: prediction and then update, i.e. prediction and error compensation. The Linear and Haar prediction schemes are based on $2^{nd}$ generation wavelets. That is, for every data value at an odd numbered position in a row or column (which may be referred to as an "odd data value") a predicted value is determined based on some set of one or more data values at even positions (which may be referred to as "even data values"). In the Haar prediction scheme the determination is based on one even data value, and in the Linear prediction scheme the determination is based on two even data values. The odd data values are replaced with differences between the actual data values and the predicted values. When determining second generation wavelets, the even values are then updated using a small number of the neighbouring modified odd values. Then the prediction is repeated on a different scale to predict other data values, e.g. the updated even values are grouped into a set of values, assigned as new sets of alternating 'even' and 'odd' and the process repeated. The primary aim of the update step is to preserve image moments. Maintaining such statistical properties is useful when coefficients are quantised as part of a lossy compression process but, for lossless data compression, as in examples described herein, the update steps do not need to be included (although they could be included in some examples). Avoiding the update steps: a) has no significant detrimental effect on the average compression ratio, b) halves the number of hardware operations in the prediction processes, and c) greatly shortens the calculation dependency chain for both encoding and decoding.

The Linear and/or Haar prediction schemes may be applied at different spatial frequencies to thereby predict different ones of the data values. At each frequency a set of the data values is used to replace odd data values with differences between actual and predicted data values. When taking the highest frequency, all of the data values from the data block are in the set of data values that are used. The odd data values in the set, $P_{2i+1}$, (where i is an integer) are predicted from one or more neighbouring data values from the set with even indices e.g. $P_{2i}$ and/or $P_{2i+2}$, and $P_{2i+1}$ is replaced with the difference between the actual and predicted value for $P_{2i+1}$. At a lower frequency, the set includes fewer (e.g. half) of the data values from the data block. The process can be repeated at lower frequencies until all but one of the data values in a row are predicted from one or more other data values in that row. For example, with reference to FIG. 6, data values in column B are predicted from data values in columns A and C; data values in column C are predicted from data values in columns A and E; and data values in column E are predicted from data values in column A. The prediction and replacement operations, which are used to determine the first coefficients, $P'_{2i+1}$, for the odd data values, $P_{2i+1}$, using the Linear and Haar prediction schemes are given by:

$$P'_{2i+1}=P_{2i+1}-\text{LPredict}(P_{2i},P_{2i+2}) \bmod 2^8 \text{(Linear)} \quad (1)$$

$$P'_{2i+1}=P_{2i+1}-P_{2i} \bmod 2^8 \text{(Haar)} \quad (2)$$

where the function LPredict is given by:

$$\text{LPredict}(A, B) = \begin{cases} \left(\left\lceil \frac{A+B}{2} \right\rceil + 2^7\right) \bmod 2^8, & \text{if } |A-B| \geq 2^7 \\ \left\lceil \frac{A+B}{2} \right\rceil \bmod 2^8, & \text{otherwise} \end{cases} \quad (3)$$

Figure 7:
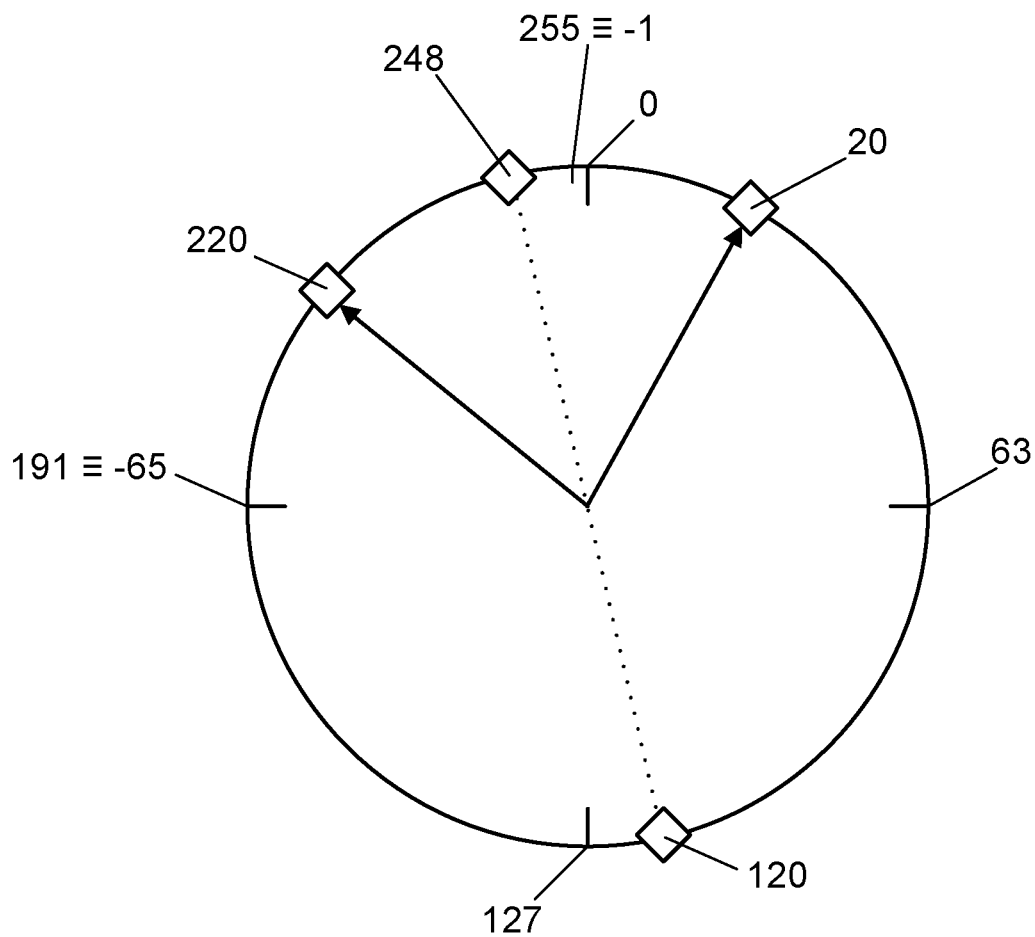
FIG. 7 shows an illustration of a Linear prediction method.

The purpose of the LPredict function is to generate the most probable average of two input values that have been calculated modulo $2^8$. Referring to FIG. 7, if one considers a clock face with 256 (i.e. $2^8$) 'minutes', then there are two paths one can take to traverse from any two positions on the clock. Because, in the example shown in FIG. 7, calculations are performed mod $2^8$, any 8-bit value represents all values of the larger, but finite, congruent set, but given that the expected probability distribution function is heavily biased towards zero, values with smaller magnitudes are far more likely to be the actual value. As an example, FIG. 7 shows an illustration of how the LPredict function can predict a value for the data value $P_{2i+1}$ when $|P_{2i}-P_{2i+2}|\geq 2^7$. In the example shown in FIG. 7, $P_{2i}=220$ and $P_{2i+2}=20$. If a simple average is taken of these two values, by determining $$\left\lceil \frac{P_{2i}+P_{2i+2}}{2} \right\rceil \bmod 2^8,$$

then the result will be 120. However, according to the equations given above, since $|P_{2i}-P_{2i+2}P|\geq 2^7$, then the result of the LPredict function is given by $$\left(\left\lceil \frac{P_{2i}+P_{2i+2}}{2} \right\rceil + 2^7\right)$$

mod $2^8$=(120+128) mod $2^8$=248, as shown in FIG. 7. Due to the modulo operation, 248 is congruent to a value of −8. A value of −8 is much more likely than a value of 120, and as such −8 (which is congruent to 248) is determined as the result of the LPredict function.

The 'branch' in the LPredict function is trivial to implement in hardware, since the 'comparison' is an XOR of the two Most Significant Bits (MSBs) of the two data values $P_{2i}$ and $P_{2i+2}$. Furthermore, the applied offset (of $2^7$) is again, implemented as a one-bit XOR operation.

Spatial decorrelation is applied to the different colour channels independently by the respective spatial decorrelation modules 204. In an example, each of the spatial decorrelation modules 204 operate as shown in FIG. 6 with a throughput of one 8×8 block of data values in 8 clock cycles, stepping to a different row of the block each on each clock cycle. Each of the processing units (610 and 614) shown in FIG. 6 can perform either a linear or, by repetition of the inputs, a Haar prediction per clock cycle. In other examples, the processing units which only perform Haar predictions (e.g. processing units $610_4$, $610_6$ and $610_7$), might only receive two inputs, to avoid repeating inputs. If two adjacent neighbouring data values at a particular frequency are available then the Linear prediction is applied, whereas if only one adjacent neighbouring data value is available at a particular frequency then the Haar prediction is applied. On each clock cycle a row is decorrelated at three frequencies using linear prediction for columns B, D, F, and C, and Haar prediction for columns H, G and E. For 8×8 blocks, column A is unmodified by the horizontal prediction performed by the processing units 610.

The equations given above for the Linear and Haar prediction schemes relate to the case in which the data values comprise 8 bits. It would be immediately apparent to a person skilled in the art how to modify these equations for data values having a different number of bits. For example, for n-bit data values, occurrences of $2^8$ in the equations above would be replaced with $2^n$ and occurrences of $2^7$ would be replaced by $2^{n-1}$.

The first coefficients determined by the first stages 606 of the processing pipelines 604 are output from the first stages to the corresponding second stages 608 of the processing pipelines 604. It is noted that the last processing pipeline $604_8$ does not need a processing unit in the example shown in FIG. 6 in which an 8×8 block of data values is processed because in this case the data values for column A pass through the first stage 606 of the processing pipeline $604_8$ unchanged.

In step S906 the first coefficients outputted from the first stages 606 are received at the corresponding second stages 608 of the processing pipelines 604. In particular, the first coefficients are received at the registers 612 of the second stages 608 of the processing pipelines 604.

The first coefficients are then spatially decorrelated vertically. The rows of the data block are input to the parallel processing pipelines 604 in an order such that after a first one of the rows has been received by the second stages 608 and stored in the registers 612, the second coefficients of each subsequent row of the block that is received at the second stages 608 can be determined based on the stored data values in the registers 612. For example, as described in more detail below, the rows may be supplied to the processing pipelines 604 in the order: row 0, row 4, row 2, row 1, row 3, row 6, row 5 and then row 7 (although other orders would also be valid, such as row 0, row 4, row 6, row 7, row 5, row 2, row 3 and then row 1). The transpose of the horizontal decorrelation described above is then applied in the y-direction (i.e. in a vertical direction along the columns), at the target rate, with only minimal additional storage. In particular, as in the example shown in FIGS. 6 and 8 (described below), the registers 612 may not need to store more than three of the data values at any one time.

In step S910 the first coefficients received from the corresponding first stages 606 are selectively stored in the registers 612 of each of the second stages 608 of the processing pipelines 604. That is, for some of the rows, the first coefficients are stored in the registers 612, whereas for others of the rows, the first coefficients are not stored in the registers 612. In particular, the first coefficients are stored in the registers 612 if those first coefficients are to be used to determine the second coefficients for subsequent rows.

As a matter of terminology, with reference to the spatial decorrelation process, the "first coefficients" are the outputs from the first stages 606 (i.e. the values after horizontal decorrelation, as indicated by the single dashed labels (A' to H') in FIG. 6), and the "second coefficients" are the outputs from the second stages 608 (i.e. the values after horizontal and vertical decorrelation, as indicated by the double dashed labels (A" to H") in FIG. 6).

For each of the processing pipelines 604, the register 612 is configured to output up to two values at a time (e.g. per clock cycle) to the respective processing unit 614. On each iteration, the first coefficients received from the first stage 606 of the corresponding processing pipeline 604 are passed to the respective processing unit 614 and the registers 612 are configured to output zero, one or two of the first coefficients stored in the registers 612 to the respective processing unit 614. In step S912, each of the processing units 614 determines a second coefficient to represent a respective one of the data values from the row being processed. The second coefficients are spatially decorrelated values representing the data values of the block and are output from the spatial decorrelation module 204. For the first row of data values of a block, the second coefficients are determined based solely on the first coefficients received for the data values of that row. The first coefficients for the data values of the first row are stored in the registers 612 such that, for a subsequent row of data values from the block, the second coefficients are determined based on the stored first coefficients and the first coefficients for the subsequent row. For example, for all of the rows of data values except the first row of a block, the second coefficients for a row of data values are determined based on: (i) the corresponding first coefficients for the row received at the second stages 608, and (ii) at least one of the first coefficients for a respective at least one other row stored in the respective registers 612.

Figure 8:
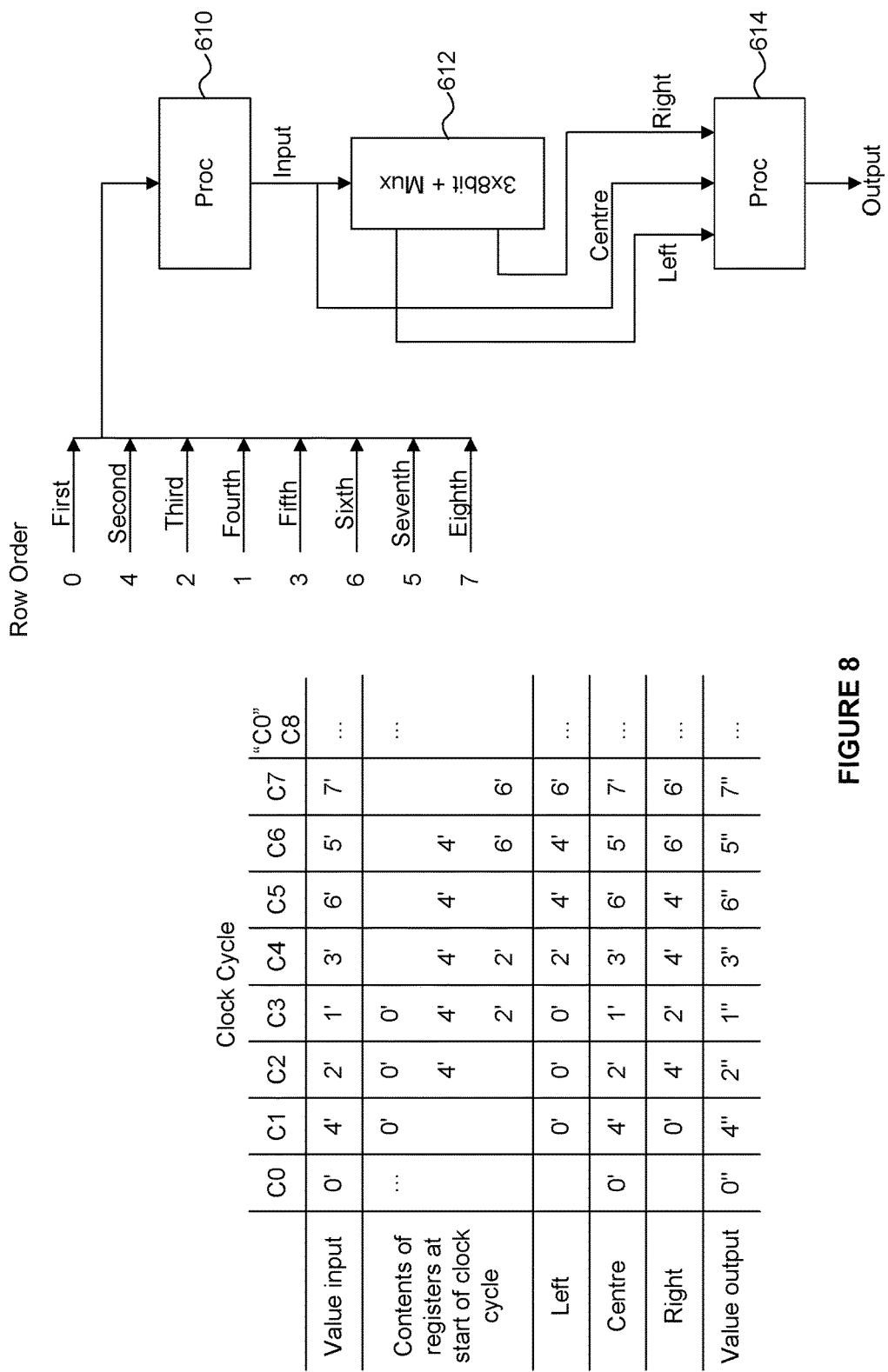
FIG. 8 illustrates the operation of a processing pipeline of the spatial decorrelation module.

FIG. 8 shows an example of the order in which data values from different rows of an 8×8 block are input into the processing pipelines 604. The operation of the second stages 608 of the processing pipelines 604 is summarised in the table shown in FIG. 8. It can be seen that the processing unit 614 has three inputs labelled "Left", "Centre" and "Right" in FIG. 8, whereby the centre input is coupled to the output of the processing unit 610, whereas the left and right inputs are coupled to outputs of the registers 612. On a first clock cycle (clock cycle C0), the second stages 608 of the pipelines 604 receive the first coefficients for row 0 (the value input to the second stage 608 is indicated by a single prime: 0') and output the second coefficients for row 0 (the value output from the second stage 608 is indicated by a double prime: 0"), wherein the storage units store the first coefficients for row 0 (i.e. following clock cycle C0, the registers 612 store the first coefficients for row 0, denoted 0').

On a second clock cycle (clock cycle C1), the second stages 608 of the pipelines 604 receive the first coefficients for row 4 (the value input to the second stage 608 is 4') and output the second coefficients for row 4 (the value output from the second stage 608 is 4"). That is, the processing unit 614 receives 4' on the centre input and receives 0' on the left and right inputs, such that the second coefficients for row 4 (denoted 4″) are determined by the processing units 614 based on the received first coefficients for row 4 (denoted 4′) and the stored first coefficients for row 0 (denoted 0′, retrieved from the registers 612). Following clock cycle C1 the storage units store the first coefficients for rows 0 and 4 (i.e. the registers 612 store the first coefficients for rows 0 and 4, denoted 0′ and 4′).

On a third clock cycle (clock cycle C2), the second stages 608 of the pipelines 604 receive the first coefficients for row 2 (the value input to the second stage 608 is 2′) and output the second coefficients for row 2 (the value output from the second stage 608 is 2″). That is, the processing unit 614 receives 2′ on the centre input, 0′ on the left input and 4′ on the right input, such that the second coefficients for row 2 (denoted 2″) are determined by the processing units 614 based on the received first coefficients for row 2 (denoted 2′) and the stored first coefficients for rows 0 and 4 (denoted 0′ and 4′, retrieved from the registers 612). Following clock cycle C2 the storage units store the first coefficients for rows 0, 4 and 2 (i.e. the registers 612 store the first coefficients for rows 0, 4 and 2, denoted 0′, 4′ and 2′).

On a fourth clock cycle (clock cycle C3), the second stages 608 of the pipelines 604 receive the first coefficients for row 1 (the value input to the second stage 608 is 1′) and output the second coefficients for row 1 (the value output from the second stage 608 is 1″). That is, the processing unit 614 receives 1′ on the centre input, 0′ on the left input and 2′ on the right input, such that the second coefficients for row 1 (denoted 1″) are determined by the processing units 614 based on the received first coefficients for row 1 (denoted 1′) and the stored first coefficients for rows 0 and 2 (denoted 0′ and 2′, retrieved from the registers 612). Following clock cycle C3 the storage units store the first coefficients for rows 4 and 2 (i.e. the registers 612 store the first coefficients for rows 4 and 2, denoted 4′ and 2′). The first coefficient for row 0 (denoted 0′) may be discarded because it is not needed for subsequent rows, but it may be simpler to leave 0′ in the registers 612 until it is overwritten.

On a fifth clock cycle (clock cycle C4), the second stages 608 of the pipelines 604 receive the first coefficients for row 3 (the value input to the second stage 608 is 3′) and output the second coefficients for row 3 (the value output from the second stage 608 is 3″). That is, the processing unit 614 receives 3′ on the centre input, receives 2′ on the left input and receives 4′ on the right input, such that the second coefficients for row 3 (denoted 3″) are determined by the processing units 614 based on the received first coefficients for row 3 (denoted 3′) and the stored first coefficients for rows 2 and 4 (denoted 2′ and 4′, retrieved from the registers 612). Following clock cycle C4 the storage units store the first coefficients for row 4 (i.e., the registers 612 store the first coefficients for row 4, denoted 4′). The first coefficient for row 2 (denoted 2′) may be discarded because it is not needed for subsequent rows, but it may be simpler to leave 2′ in the registers 612 until it is overwritten.

On a sixth clock cycle (clock cycle C5), the second stages 608 of the pipelines 604 receive the first coefficients for row 6 (the value input to the second stage 608 is 6′) and output the second coefficients for row 6 (the value output from the second stage 608 is 6″). That is, the processing unit 614 receives 6′ on the centre input and receives 4′ on the left and right inputs, such that the second coefficients for row 6 (denoted 6″) are determined by the processing units 614 based on the received first coefficients for row 6 (denoted 6′) and the stored first coefficients for row 4 (denoted 4′, retrieved from the registers 612). Following clock cycle C5 the storage units store the first coefficients for rows 4 and 6 (i.e. the registers 612 store the first coefficients for rows 4 and 6, denoted 4′ and 6′).

On a seventh clock cycle (clock cycle C6), the second stages 608 of the pipelines 604 receive the first coefficients for row 5 (the value input to the second stage 608 is 5′) and output the second coefficients for row 5 (the value output from the second stage 608 is 5″). That is, the processing unit 614 receives 5′ on the centre input, receives 4′ on the left input and receives 6′ on the right input, such that the second coefficients for row 5 (denoted 5″) are determined by the processing units 614 based on the received first coefficients for row 5 (denoted 5′) and the stored first coefficients for rows 4 and 6 (denoted 4′ and 6′, retrieved from the registers 612). Following clock cycle C6 the storage units store the first coefficients for row 6 (i.e. the registers 612 store the first coefficients for row 6, denoted 6′). The first coefficient for row 4 (denoted 4′) may be discarded because it is not needed for subsequent rows, but it may be simpler to leave 4′ in the registers 612 until it is overwritten.

On an eighth clock cycle (clock cycle C7), the second stages 608 of the pipelines 604 receive the first coefficients for row 7 (the value input to the second stage 608 is 7′) and output the second coefficients for row 7 (the value output from the second stage 608 is 7″). That is, the processing unit 614 receives 7′ on the centre input and receives 6′ on the left and right inputs, such that the second coefficients for row 7 (denoted 7″) are determined by the processing units 614 based on the received first coefficients for row 7 (denoted 7′) and the stored first coefficients for row 6 (denoted 6′, retrieved from the registers 612). It is not important what is stored in the registers 612 following clock cycle C7 because in the subsequent clock cycle, the process repeats with a new block, so the data in the registers 612 for the current block will not be used. The data may be overwritten by data for a new block when such data is to be stored in the registers 612.

In the example, shown in FIG. 8, the registers 612 each store up to three of the first coefficients at any given time, in order to process the data values from a block comprising eight rows of data values. In general, each of the registers 612 will have the capacity to store up to $\log_2(r)$ first coefficients at any given time, where r is the number of rows in the block of data values.

The processing performed by the processing units 614 may be Linear or Haar processing, e.g. depending upon the number of different inputs that are provided in order to determine the second coefficients.

Figure 10:
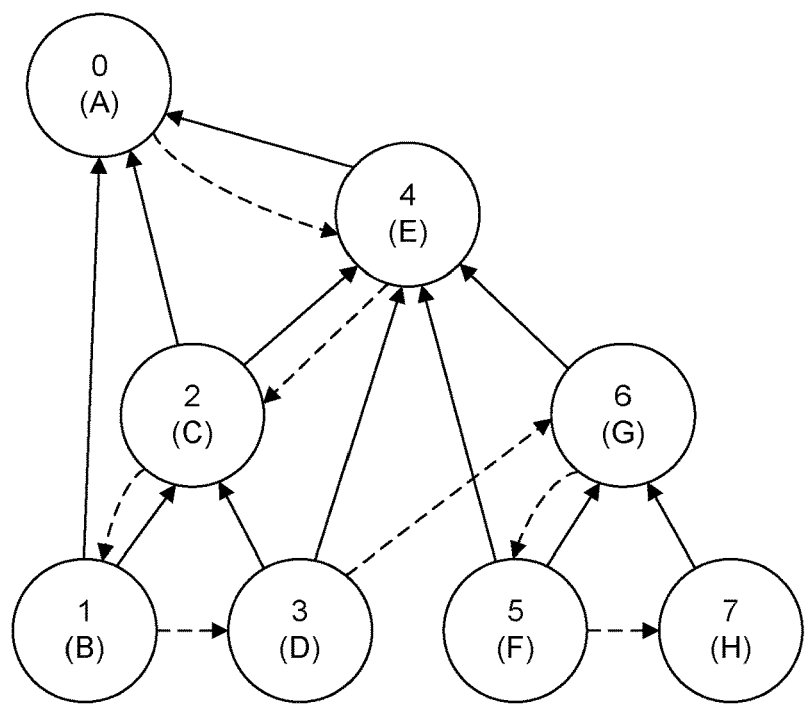
FIG. 10 shows a dependency tree for the order in which rows are processed in the spatial decorrelation process.

FIG. 10 shows a dependency graph of rows (or columns) for use in the spatial decorrelation process. Solid lines represent dependencies. For example, row 0 (column A) is not dependent on other rows (columns); row 4 (column E) is dependent on row 0 (column A); row 2 (column C) is dependent on rows 0 and 4 (columns A and E); row 6 (column G) is dependent on row 4 (column E); row 1 (column B) is dependent on rows 0 and 2 (columns A and C); row 3 (column D) is dependent on rows 2 and 4 (columns C and E); row 5 (column F) is dependent on rows 4 and 6 (columns E and G); and row 7 (column H) is dependent on row 6 (column G). The rows (columns) are processed in an order such that after the first row (column) has been processed for a block, when subsequent rows (columns) are processed, the rows (columns) on which they depend have already been processed. The dashed lines in FIG. 10 describe the order in which rows (columns) are processed in the example shown in FIG. 8. It is beneficial to minimise the amount of calculation and the amount of storage of previous rows of data that is required and it may also be beneficial to output the rows in as close to linear order as possible to increase the likelihood of saving area when outputting the results. The order shown by the dashed lines in FIG. 10 (i.e. row order 0, 4, 2, 1, 3, 6, 5, 7) is a good option because if pixel data is transferred from somewhere else (e.g. memory or another unit) in scan order (i.e. in row order 0, 1, 2, 3, 4, 5, 6, 7) then the order shown in FIG. 10 only needs to buffer up three rows of transferred data. The limiting factor with this order is outputting row 4 on the second cycle, wherein with the input rows arriving in scan order, row 4 is received after rows 0, 1, 2 and 3, and this means that three rows of data are buffered. However, there are a number of different orders in which the dependencies may be satisfied, as will be apparent to one skilled in the art having viewed FIG. 10. For example, the rows could be processed in the order: 0, 4, 2, 3, 1, 6, 7, 5; or in the order: 0, 4, 6, 5, 7, 2, 1, 3 to give just two more examples. In this last example, the limiting factor is outputting row 6 on the third cycle, wherein with the input rows arriving in scan order, row 6 is received after rows 0, 1, 2, 3, 4 and 5, so this means that four rows of data are buffered.

For blocks with a different number of rows (i.e. not eight rows as in the example given above), a skilled person would know how to modify the order of inputting the rows accordingly so that on each clock cycle (except the clock cycle in which the first row of a block is processed), data values can be output for a row based on previously stored rows of data values from the block which have been stored in the registers 612.

The spatially decorrelated values (i.e. the second coefficients output from the processing units 614) from each pipeline 604 are passed to respective remapping units 618. The remapping units 618 remap the data values so that they can be more efficiently encoded by the subsequent entropy encoding process. The remapped data values may be in an unsigned integer format. The remapping process is configured in accordance with the spatial decorrelation technique used by the spatial decorrelation module such that the likelihood of remapped data values having particular magnitudes decreases for larger magnitudes.

An example of the remapping process is now described. The remapping process operates on the 8-bit values coming from the processing units 614. If the most significant bit of a data value is a zero then the remapping process involves removing the most significant bit (which is a zero) and appending a zero to the remaining bits of the data value. For example, 00010101 would be remapped to become 00101010 and 01000100 would be remapped to become 10001000. If the most significant bit of a data value is a one (such that the data value represents a negative number) then the remapping process involves removing the most significant bit (which is a one), complementing each of the remaining bits (e.g. using XOR operations), and then appending a one to the bits. For example, 10010101 would be remapped to become 11010101, and 11000100 would be remapped to become 01110111. The remapping process described here is very simple to implement, e.g. in hardware simply by reordering some the bits (e.g. to move the MSB to be in the LSB position), and by optionally complementing the other bits if the MSB is a 1. Table 1 shows how the bits of some of the data values are remapped.

TABLE 1

Remapping of bits

| Data value | Unmapped bits | Remapped bits |
| --- | --- | --- |
| 0 | 00000000 | 00000000 |
| −1 | 11111111 | 00000001 |
| 1 | 00000001 | 00000010 |
| −2 | 11111110 | 00000011 |
| 2 | 00000010 | 00000100 |
| −3 | 11111101 | 00000101 |
| 3 | 00000011 | 00000110 |
| −4 | 11111100 | 00000111 |
| 4 | 00000100 | 00001000 |

In the example described above, the linear prediction equation is given by equation 1, wherein the LPredict function is defined by equation 3 and involves rounding up the average of two adjacent data values. The differences (P between a pixel value and the average of its immediate neighbours is most likely to be zero, and then the likelihood of particular differences reduces for differences further from zero. The quantisation of the differences (due to the finite number of bits, e.g. 8 bits, used to represent the differences and the rounding up of the averages (i.e. using the ceiling function in the division operation rather than rounding down the averages)) in the LPredict function means that the distribution of differences are 'shifted' slightly in the negative direction. Noting that, with the remapping example described above, as the number of (significant) bits required to store a positive value 'X' after remapping is occasionally greater than (but never less than) the number of bits required to store the remapped value of '−X', it can be appreciated that biasing the distribution in the negative, rather than in the positive direction (which would occur with rounding down the averages), results in better compression. This means that the remapped data values are unsigned, with a distribution which is biased towards zero.

As a specific example, using this remapping process in conjunction with the LPredict function described above (which involves rounding up the average of two adjacent data values) means we are likely to get more "−1" coefficients than "+1" coefficients outputted from the second stages of the spatial decorrelation module. According to the remapping process shown in Table 1, a value of −1 is remapped to 00000001, and a value of +1 is remapped to 00000010. As will be apparent from the following description of the entropy encoding process, 00000001 (which has one significant bit, i.e. seven leading zeroes) can be encoded with fewer bits than 00000010 (which has two significant bits, i.e. six leading zeroes).

In a different example, the spatial decorrelation could define the differences as the negative of those defined in equations 1 and 2, with the LPredict function using a floor operation rather than a ceiling operation such that the averages are rounded down rather than up. This would also result in a situation in which the simple remapping process described above would result in the likelihood of remapped data values having particular magnitudes decreasing for larger magnitudes.

The spatial decorrelation modules 204 described above are configured to implement spatial decorrelation along the rows of data values in the first stages 606 and implement spatial decorrelation along the columns of data values in the second stages 608, such that a row of spatially decorrelated values may be output on each of a plurality of consecutive clock cycles. In other examples, the processing of rows and columns may be swapped, such that the spatial decorrelation modules 204 implement spatial decorrelation along the columns of data values in the first stages and along the rows of data values in the second stages, such that a column of spatially decorrelated values may be output on each of a plurality of consecutive clock cycles.

The spatially decorrelated and remapped data values are output from the spatial decorrelation modules 204 and provided to the corresponding entropy encoding modules 206. As described above, the entropy encoding modules 206 apply entropy encoding to the spatially decorrelated values using a variable-length coding scheme. The coding scheme was chosen to allow for fast encoding, and in particular fast decoding of the data values, at predictable rates.

A realisation has been made that the data values that are output from the spatial decorrelation modules 204 are not perfectly spatially decorrelated, such that the data values are not perfectly independent. Therefore, when there is detail in a local part of an input block (e.g. image components with high spatial frequency, such as stripy regions in an image) it is likely that several neighbouring data values outputted from the spatial decorrelation modules 204 for the local part of the input block will be of similar magnitudes. This similarity can be utilised to improve the entropy encoding process compared to a process which treats each data value independently. In particular, in comparison to the entropy encoding/decoding scheme described in UK patent number 2530312, the scheme described herein: (i) provides easier parallel decoding of multiple encoded data values, (ii) provides, on average, slightly better compression (in terms of reduced numbers of bits of encoded data values), and (iii) avoids a need to explicitly store the length of the compressed data channels. In particular, the entropy encoding/decoding scheme described in UK patent number 2530312 involves redundancy in storing length information twice, i.e. in the form of per-coefficient prefix data and overall lengths. The entropy encoding/decoding scheme described herein eliminates this redundant storage.

Figure 11:
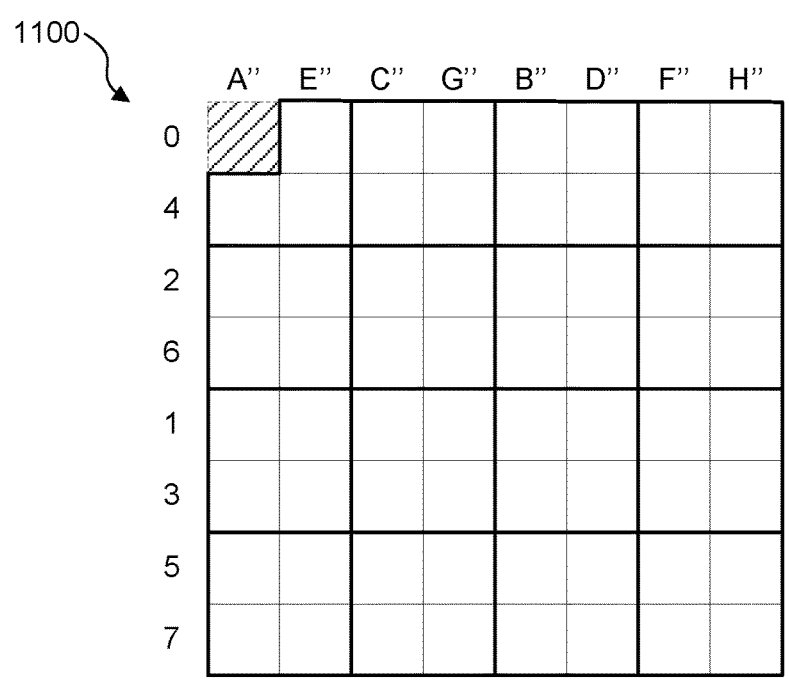
FIG. 11 illustrates a block of data values to be entropy encoded.
Figure 12:
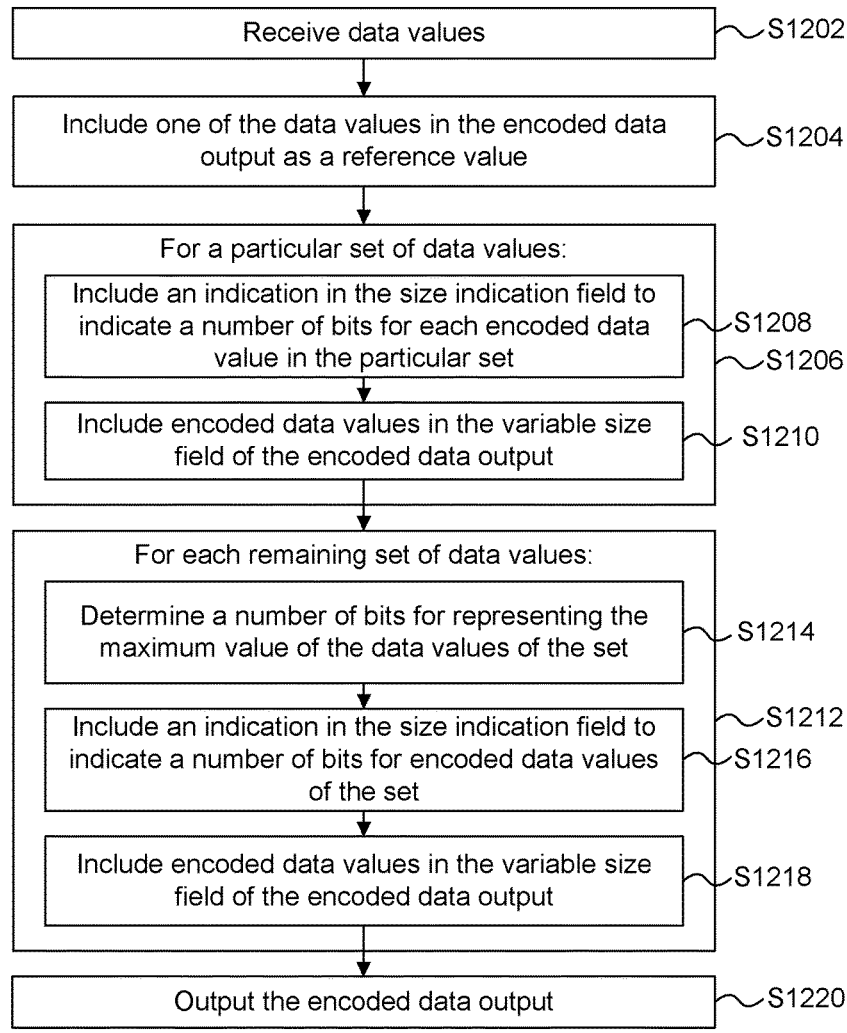
FIG. 12 is a flow chart for a method of performing entropy encoding on a plurality of data values.
Figure 13:
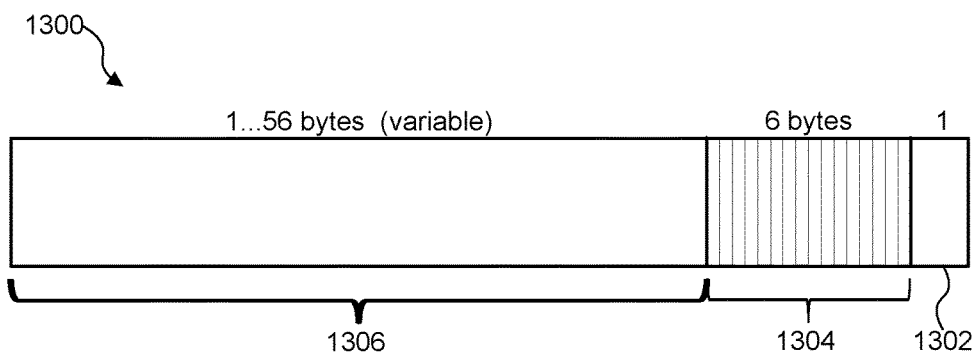
FIG. 13 shows an example format of an entropy encoded data output.

FIG. 11 shows an 8×8 block of data values 1100 which have been spatially decorrelated and remapped by one of the spatial decorrelating modules 204. The data values relate to respective pixel values. A method of performing entropy encoding on the block of data values at an entropy encoding module 206 is described with reference to the flow chart shown in FIG. 12. The entropy encoding module 206 outputs an encoded data output 1300 (as shown in FIG. 13) which comprises encoded data values to represent the data values in the 8×8 block 1100. The encoded data output 1300 has a variable length depending on the compression that can be achieved by the entropy encoding process. In particular, in an example in which each received data value in the block 1100 comprises 8 bits (i.e. 1 byte), the encoded data output 1300 comprises a reference value field 1302 which is 8 bits (1 byte) wide, a size indication field 1304 which is 48 bits (6 bytes) wide, and a variable size field which, in this example has been configured to maintain 8-bit alignment of fields, is anywhere between 8 bits (1 byte) and 448 bits (56 bytes) wide. If the entropy encoding process is not able to losslessly represent the data values in the data block 1100 without exceeding the number of bits available in the encoded data output 1300 (i.e. 504 bits or 63 bytes) then the data values in the data block 1100 are stored in raw form in the encoded data output, with 8 bits per data value. A header section of a data packet in which the encoded data output is placed has an indication to indicate the format of the encoded data within the data packet. For example, the indication may comprise two bits such that up to four different encoding modes can be set, which may include a raw data format, an entropy encoded format and a constant format (in which all of the data values within a block have the same value, such that the value can be stored once (using 8 bits) to represent the value of each of the data values within the block.

In step S1202 the block of data values is received at an entropy encoding module 206. The rows and columns of the block are arranged as shown in FIG. 11. The block of data values 1100 comprises a plurality of sets of data values (most of which in this example are 2×2 sets of data values (relating to 2×2 sets of pixel values), but in other examples, the sets could be different shapes and/or sizes). For example, the sets of data values could be two dimensional sets of data values of any suitable size and shape, e.g. the sets could p×q sets of data values, where p>1 and q>1. In the main examples described herein, p=q=2. In some examples, p could be an integer in the range 2≤n≤4, and q could be an integer in the range 2≤m≤4. To give some specific examples, the sets could be 3×2 sets, 2×3 sets, 3×3 sets or 4×4 sets of data values, e.g. where the data values relate to respective pixel values. The block 1100 comprises fifteen 2×2 sets of data values, and one particular set (in the top left of the block) which comprises just three data values. The top left data value (A0) is not entropy encoded, and instead in step S1204 the data value at position A0 is included in the reference value field 1302 of the encoded data output 1300. Since the top left set represents a similar sized set compared to the other sets in the block, but minus the data value which is to be used as the reference value, the top left set includes fewer (e.g. 3 rather than 4) data values than each of the other sets.

In the example shown in FIG. 11, the rows in the block have the order A", E", C", G", B", D", F", H", and the columns in the block have the order 0, 4, 2, 6, 1, 3, 5, 7 for the purposes of the entropy encoding. Other examples, may order the rows and columns differently to that shown in FIG. 11. The example order shown in FIG. 11 does not exactly match the order in which the rows are processed by the spatial decorrelation modules described above (e.g. row 6 is shown above rows 1 and 3). With the exception of the top left 2×2 set (which only groups three values and is encoded slightly differently), each aligned 2×2 set of values will be encoded together. This example grouping has been chosen such that: (a) the values within a set belong (where possible) to the same spatial frequency, and (b) the values within a set come from pixels that are, where possible, nearby spatially. This is done because these are more likely to be "similar" in magnitude and, hence, the sets can be compressed more effectively.

As described above, the data values are unsigned with a distribution which is biased towards zero (due to the colour correlation and spatial decorrelation processes). Therefore, data values are likely to have leading zeroes. Therefore, the data values can be compressed simply by removing one or more leading zeroes from the data values (where possible). An indication is used to indicate how many leading zeroes have been removed.

The top left set of four data values are treated differently in that: (a) the top left pixel is used as the reference and stored separately, and (b) the remaining three values have a different encoding scheme that has been "trained" on a large set of image data so that: (i) for alignment purposes, the total number of bits used to represent the three values is a multiple of 4 (this matches the 2×2 blocks), and (ii) the total storage cost (for the training image set) has been minimised. The particular set of data values in the top left of the block is processed at S1206.

Specifically, at step S1208 an indication for the particular set is included in the size indication field 1304. Each indication in the size indication field has three bits, for a respective set of data values in the block 1100. This 3-bit indication can be used as an index into a Look Up Table to retrieve a number of bits for each data value in the particular set, such that the number of bits for each value is sufficient to store that value. There are sixteen sets of data values in the block 1100, such that the size indication field comprises 48 bits (i.e. 316 bits), or 6 bytes. The fifteen sets of four data values in a block will be encoded with numbers of bits which are multiples of four (because, as described below, each encoded data value in a set of four data values has the same number of bits), and on any given row each of these fifteen sets contribute a multiple of two bits. To maintain a convenient alignment of compressed data (as restricting alignment of data can reduce hardware complexity) restrictions are applied to the available choices for the top-left set which only has 3 elements. The top left set has three data values, one of which (E0) is in row 0. For hardware efficiency, it is desirable that the total data for a row is an even number of bits, so the possible lengths of the encoded data values which can be used to represent this data value are restricted to even numbers. Similarly, the combined lengths of the two encoded data values which are used to represent the other two data values of this set (A4 and E4) sum to an even value. Furthermore, in this example, the combined length of all the encoded data values in the encoded data output will be rounded up to the nearest byte (so that the encoded data outputs are aligned on byte boundaries), and all of the other sets of data values in the block. Therefore, the total number of bits used to encode the top left set of data values is also a multiple of four.

With a size indicator including three bits, eight sets of lengths for the encoded data values can be set. For example, Table 2 shows some possible lengths of the encoded data values which may be represented by the eight different size indications for the top left block. The lengths shown in Table 2 were made by evaluating a very large set of images and choosing the combinations (from a very large set of possible combinations) that resulted in the lowest overall storage costs.

TABLE 2 lengths of encoded data values for top left set

| Size indication | E0 | A4 | E4 | Total Length |
| --- | --- | --- | --- | --- |
| 000 | 0 | 0 | 0 | 0 |
| 001 | 2 | 1 | 1 | 4 |
| 010 | 2 | 3 | 3 | 8 |
| 011 | 4 | 3 | 5 | 12 |
| 100 | 4 | 5 | 3 | 12 |
| 101 | 6 | 5 | 5 | 16 |
| 110 | 6 | 7 | 7 | 20 |
| 111 | 8 | 8 | 8 | 24 |

The entropy encoding module 206 chooses the coding from the possible options (e.g. as shown in Table 2) with the least total length that is able to (losslessly) represent the {E0,A4,E4} triple by removing leading zeroes from the data values. In the event of a tie (e.g. if deciding between size indications 011 and 100 in the example shown in Table 2) either tied code could be chosen, but as an example, the code with the least numerical encoding may be chosen (e.g. 011).

In step S1210 the encoded data values for the top left set are included in the variable size field 1306 (e.g. at the start of the variable size field 1306) of the encoded data output 1300.

The remaining (e.g. fifteen) sets of data values in the block 1100 are then processed. Block S1212 represents the steps that are performed for each of the remaining 2×2 sets shown in FIG. 11. Specifically, in step S1214, a number of bits (e.g. a minimum number of bits) for representing the maximum value of the data values of a set is determined, and in step S1216 an indication of the determined number of bits is included in the size indication field 1304 of the encoded data output 1300 for the set. Step S1214 can be done by finding which of the data values in the set has the smallest number of leading zeros, and then by identifying the smallest available encoding that will suffice. It is noted that not all possible data lengths may be available to be encoded. For example, as described in the example below, a data length of seven bits is not available to be encoded. Therefore, the determined number of bits may be a minimum "valid" number of bits which can be used to represent the maximum value of the received data values in the set, wherein a number of bits is valid if it can be indicated by an indication to be included in the size indication field 1304. For example, there may be a predetermined set of valid numbers of bits which can be indicated by said indication (e.g. as listed in Table 3 below), and the minimum valid number of bits may be the minimum of the valid numbers of bits in the predetermined set which is sufficient to represent the maximum value of the received data values in the set. As mentioned above, the predetermined set of valid numbers of bits might not include all of the possible minimum numbers of bits which could be used to represent a maximum value of the received data values in a set. The possible minimum numbers of bits range from zero to n, where n is the number of bits in the data values received at the entropy encoding module (e.g. n=8 in examples described herein). In other words, one or more of the possible minimum numbers of bits may be omitted from the predetermined set of valid numbers of bits. In the example described below, where n=8, the number seven is omitted from the predetermined set of valid numbers of bits, such that the predetermined set of valid numbers of bits includes, exclusively, the numbers 0, 1, 2, 3, 4, 5, 6 and 8.

When the number of bits which is to be used to represent each of the encoded data values in a set has been determined, some leading zeroes can be removed from each of the data values in the set (if appropriate) to thereby determine the encoded data values, such that each of the encoded data values in a set has the determined number of bits for that set.

In step S1218 the encoded data values representing the data values in the set are included in the variable size field (1306) of the encoded data output 1300. The order in which the encoded data values are included in the variable size field 1306 is predetermined and corresponds with the order in which the indications are included in the size indication field 1304, such that when the encoded data values are decoded, the positions of the decoded data values within the block are known.

For example, if the four data values in a set are 00000011, 00000100, 00000001 and 00000000, then 00000100 is the maximum value in the set, and three is the minimum number of bits that can be used to represent the maximum value. Three is a valid number of bits in the example shown in Table 3 in the sense that an indication can be included to indicate that each of the encoded data values of the set have three bits. Therefore, five leading zeroes can be removed from each of the data values in the set. Therefore, the encoded data values for the set are 011, 100, 001 and 000, and these encoded data values are included in the variable size field 1306. An indication (e.g. 011) to indicate that three bits are used to represent each encoded data value in the set is included in the size indication field 1304. Different sets (e.g. 2×2 sets) can use different numbers of bits for their encoded data values, and each set has its own indication in the size indication field 1304 to indicate how many bits are used in the variable size field 1306 for the encoded data values of that set.

As an example, Table 3 shows how the indications may correspond to numbers of bits for the 2×2 sets.

TABLE 3 indications representing different numbers of bits for the 2 × 2 sets

| Size indication | Number of bits per encoded data value |
|---|---|
| 000 | 0 |
| 001 | 1 |
| 010 | 2 |
| 011 | 3 |
| 100 | 4 |
| 101 | 5 |
| 110 | 6 |
| 111 | 8 |

It is noted that there is no indication to indicate that seven bits are used for each encoded data value. Therefore, in this example, if the maximum 8-bit value within a set has just one leading zero then the minimum valid number of bits which can be used to represent each of the encoded data values in that set is eight (not seven). This omission of seven from the predetermined set of valid lengths for encoded data values was chosen by examining all the possible choices of number of 3 bits to a set of 8 choices. Since there are 9 options (bit lengths 0 to 8), one option is left out. Having evaluated all the possibilities (e.g. trialling leaving out 0, or 1, or 2 . . . ) against a large test suite of images, it was confirmed that leaving out "7" gives the best level of compression. It is noted that the likelihood of data values having only one leading zero is small because the colour decorrelation and the spatial decorrelation processes cause the data values to be biased towards zero.

It should be apparent that the examples described herein relate to 8-bit data values, but in other examples, the data values may include different numbers of bits (e.g. 6-bit data values), and a person skilled in the art would be able to modify the disclosure provided herein to operate with these different numbers of bits.

For example, if each of the data values received from a spatial decorrelation module has n bits, and the determined minimum valid number of bits for a particular set of received data values is m, where m≤n, then each of the received data values of the particular set has at least (n−m) leading zeroes. In this case, each of the encoded data values for the particular set consists of the m least significant bits of a corresponding n-bit received data value of the particular set. Referring to the same example as above, if the four n-bit data values (where n=8) in a set are 00000011, 00000100, 00000001 and 00000000, then the determined minimum valid number of bits for representing the maximum value of the set, m=3. A data length of 3-bits per encoded data value is a valid encoding from Table 3. Each of the data values has at least five leading zeroes. Therefore, the m-bit encoded data values for the set are 011, 100, 001 and 000.

Different sets within the block 1100 can be processed in parallel by an entropy encoding module 206. For example, the indications for the different sets within the block 1100 can be determined and included in the size indication field 1304 in parallel operations within the entropy encoding module 206. However, since the encoded data values can have variable lengths, they are included in the variable size field 1306 in a predetermined sequence.

When all of the encoded data values of the block have been included in the encoded data output 1300 then, in step S1220 the encoded data output is outputted from the entropy encoding module 206. The encoded data output representing a block of pixel values is provided to the packing module 208 for each of the colour channels, where they are packed together. For example, the packing module 208 places the encoded data outputs for the block of data values from the different colour channels into a data packet. In other words, a plurality of encoded data outputs are formed for a respective plurality of colour channels relating to the same pixels, and the plurality of encoded data outputs for a group of pixels (e.g. an 8×8 block) are packed together into a data packet for storage. The encoded data block can then be sent for storage in the memory 106, e.g. via the memory interface 114.

A header is stored with a group of encoded data blocks, e.g. the data blocks representing an image or a frame. For each encoded data block (e.g. each 8×8 block of encoded data values), a header indication is included in the header to indicate the size of the compressed data for the respective encoded data block. The header is stored separately from the encoded data values (e.g. in a dedicated portion of the encoded data output), and due to its small size, a significant portion of the header data may remain resident in a cache within the GPU. The header allows the size of the encoded data block to be known before the encoded data block is retrieved from memory, so an encoded data block can be retrieved without retrieving extraneous data. This is very useful for allowing random access to different parts of encoded data. In general, any number of bits may be used in the header as a header indication for a respective encoded data block, but in a specific example described below, four bits are used for each of the header indications.

Figure 14:
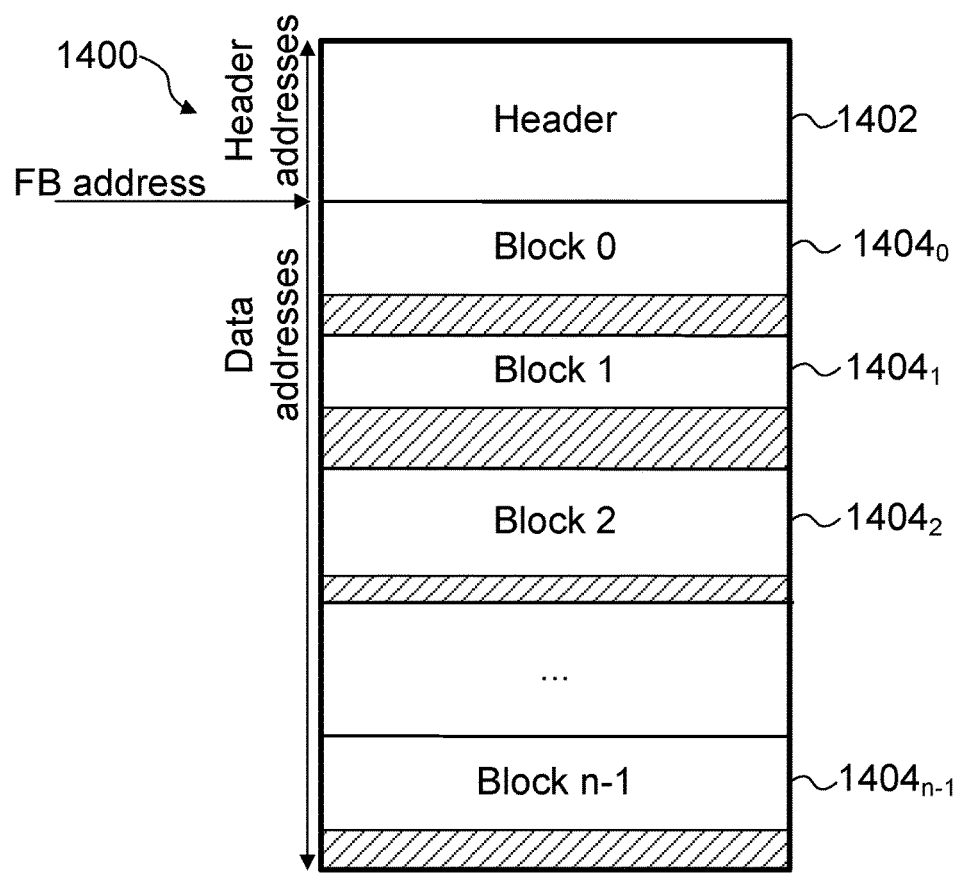
FIG. 14 illustrates an example format of encoded data for an image.

FIG. 14 illustrates a portion of encoded data 1400 which is used to represent an image (or frame) in a compressed form. The encoded data 1400 includes a header 1402 and n encoded data blocks (1404₀ to 1404$_{n-1}$). The encoded data blocks are encoded according to the techniques described above, so they have variable sizes. Each of the encoded blocks always starts at an address which is a multiple of the maximum allowed block size from the FB address. If the encoded data for a block is smaller than the maximum allowed block size, then there is a gap in address space between that encoded block and the next. These gaps are shown with hashing in FIG. 14. In this way, an encoded block starts at a predictable address (even though the size of the encoded data is variable), so a record of where the block is located does not need to be stored in memory. The location of the block can be determined in the same way as if the data was not compressed, and then that address can be jumped to. It is noted that although this may not be the best use of memory space, this does allow a reduction in memory bandwidth (i.e. the amount of data transferred to/from the memory).

A 4-bit header indication for each encoded data block 1404 is included in the header 1402. Using four bits for the header indications, allows each header indication to indicate one of sixteen different options. According to the compression techniques described above, the maximum possible size for a block of encoded data representing 64 pixels (e.g. an 8×8 block) is 256 bytes (i.e. 2048 bits), i.e. up to 32 bits per data value. The memory system into which the encoded data will be stored will have a minimum memory transfer granularity (e.g. 32 or 64 bytes), so there is little point in specifying the sizes of the compressed data too finely.

TABLE 4 header indications interpretation

| Header indication | Interpretation |
| --- | --- |
| 0000 | Predetermined constant: transparent black |
| 0001 | Predetermined constant: opaque black |
| 0010 | Predetermined constant: opaque white |
| 0011 | Predetermined constant: clear colour |
| 0100-0110 | Other modes |
| 0111 | Raw data (256 bytes) |
| 1000 | 0 . . . 32 bytes of compressed data |
| 1001 | 33 . . . 64 bytes of compressed data |
| 1010 | 65 . . . 96 bytes of compressed data |
| 1011 | 97 . . . 128 bytes of compressed data |
| 1100 | 129 . . . 160 bytes of compressed data |
| 1101 | 161 . . . 192 bytes of compressed data |
| 1110 | 193 . . . 224 bytes of compressed data |
| 1111 | 225 . . . 256 bytes of compressed data |

Table 4 shows an example interpretation of the sixteen different header indications. In different examples, the header indications may be interpreted differently. Eight of the header indications (those where the MSB is a 1 in the example shown in Table 4) indicate that the corresponding block of data is compressed data, with eight respective different size ranges. One of the header indications (0111 in the example shown in Table 4) indicates that the corresponding block of data is in raw form, i.e. it has not been entropy encoded, such that 256 bytes are used to represent the 64 data values in the block. In a different example, the "1111: 225 . . . 256 byes" indication is not included and, instead, the data is stored in the raw mode of "0111". In the example shown in Table 4, four of the header indications (0000 to 0011) indicate that the whole of the corresponding block has a predetermined value for some common cases. In these cases no further data is stored for the blocks because all of the data values in the block have the predetermined value. The common colours chosen in the example shown in Table 4 are transparent black, opaque black, opaque white, and a clear colour. A clear colour is a colour which may be set (e.g. by the application submitting geometry to be rendered) which is to be used when the rendering space is cleared. For rendering complex scenes in a 3D game, it may be relatively unlikely to have a whole block with one of the predetermined colours, but in some situations (e.g. for rendering user interfaces) it may be relatively likely that a whole block (e.g. 8×8 block of pixels) has one of the predetermined colours. When the invention is being used to compress other data (i.e. other than colour data), e.g. depth data, normal maps or YUV data, then different values for the "predetermined constant" values may be used. There are three "other modes" in the example shown in Table 4 which allows for other common cases to be efficiently encoded in an implementation-dependent manner. For example, these other modes may be for defining further predetermined colours (e.g. which may be driver defined or hardwired) or for defining an Multisample Anti-Aliasing (MSAA) mode, e.g. as 2×MSAA, 4×MSAA or 8×MSAA.

The data for an image is stored in a memory (e.g. a frame buffer) with a pointer to an address in the memory (denoted "FB address" in FIG. 14) to indicate the start of the encoded data in the frame buffer. The encoded data runs from this start address forwards through the address space of the frame buffer. In the example shown in FIG. 14, the header is stored running backwards from the same address (as indicated by the FB address pointer). In other words, the header is stored in reverse bit order, starting from the FB address. This means that the header can be accessed and the encoded data can be accessed using a single address pointer. Using a single pointer, rather than two pointers (one for the encoded data and one for the headers) or, alternatively a pointer and a offset value, reduces the amount of data that needs to be maintained or transferred throughout a GPU. In order to read a particular block of encoded data from the encoded data $1400$ (e.g. in order to read the block '2' of encoded data $1404_2$), the header indication for block 2 is read by computing the address of the memory location that contains the respective header indication, noting that this requires a subtraction relative to the FB address. The start address of the encoded data is determined by multiplying the block number by the size of an uncompressed block and adding this to the FB address while the amount of data to read is determined by interpreting the header indication In an alternative example which may decrease the bandwidth usage further yet still retain a level of random access, encoded data is grouped and packed in sets of N, e.g. N=4. To access a block in the range [N*k, N*k+N−1], say, N*k+j, the address of block N*k would be computed as above. To determine where the data for the block N*k+j is located, header indicators for N*k through to N*k+j−1 would be interpreted to find the lengths of the previous blocks in the group and thus the offset to the location of block N*k+j. The length of the data for encoded block N*k+j is, as before, encoded in the header for N*k+j.

Figure 15A:
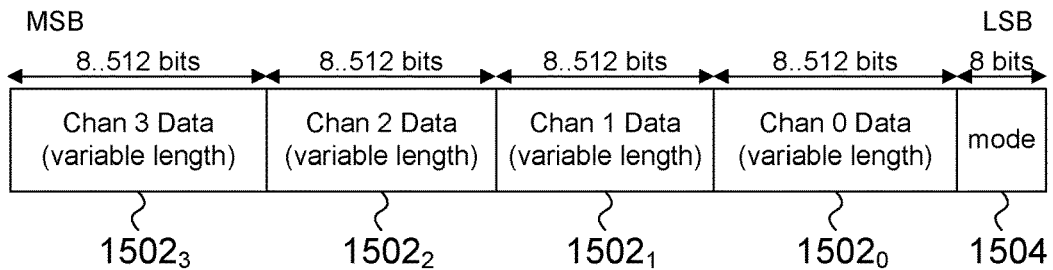
FIG. 15a illustrates an example format of a data packet for a block of pixels which are entropy encoded.
Figure 15B:
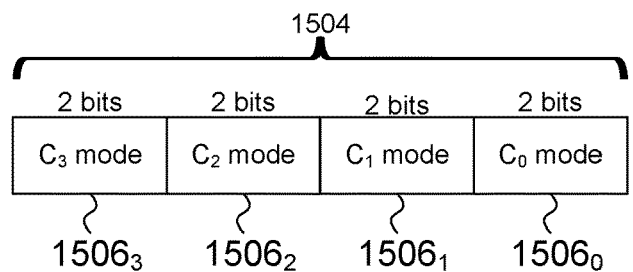
FIG. 15b shows an example format of channel mode bits included in a data packet.
Figure 15C:
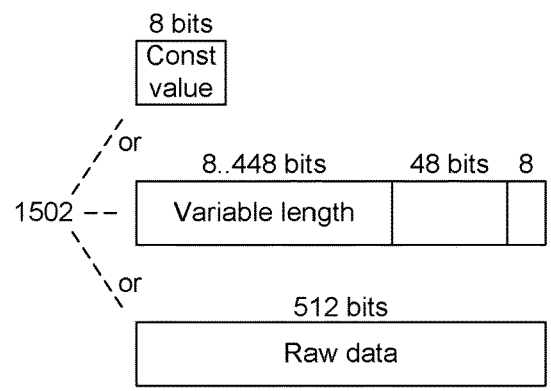
FIG. 15c shows three different example formats of channel data included in a data packet.

FIG. 15a shows a data packet including the encoded data values for a data block, where the data packet is entropy encoded (i.e. the header indication in the header 1402 for the block indicates that the data is in compressed form). The data packet includes the encoded data values ($1502_0$ to $1502_3$) for the four channels (C0 to C3) of the data block. In some examples, the data block corresponds to 64 pixels, e.g. arranged in an 8×8 block, and the four channels are R, G, B and A. Each portion of encoded data for a respective channel 1502 includes between 8 and 512 bits depending on the outcome of the entropy encoding as described above. The data packet includes a channel packing modes portion 1504. FIG. 15b shows that this mode portion 1504 comprises 8 bits: 2 bits for each of the four channels ($1506_0$ to $1506_3$) to indicate the mode in which the data for the respective channel is represented in the corresponding data portion 1502. Using two bits for each channel allows four different modes to be used for the channel data, and the different channels can use different modes, i.e. they are compressed independently, in order to achieve greater compression. For example, the four modes may be: (i) constant, (ii) reserved, (iii) entropy encoded, and (iv) raw data. If the mode indication $1506_x$ for a channel indicates a constant mode, then the corresponding data $1502_x$ has a single data value (e.g. an 8-bit data value) which represents the value of all of the data values in the block for the channel, i.e. the channel data values are constant for the block. FIG. 15c illustrates that the data 1502 may include an 8-bit constant value (the top line in FIG. 15c) in the constant mode. The reserved mode can be used for implementation-dependent purposes. To give two examples of uses for the reserved mode: (i) a different entropy encoding mode may be used where a different number of bits (e.g. 2 bits) is used for each of the size indications, such that different numbers of encoded bits can be validly encoded, and (ii) a palette encoding mode, where encoded data values are selected from a set of known (e.g. predetermined) values (or "palette"). If the mode indication $1506_x$ for a channel indicates the entropy encoded mode, then the corresponding data $1502_x$ is encoded according to the entropy encoding process described above. FIG. 15c illustrates that the data 1502 may include a variable length data (the middle line in FIG. 15c) in the entropy encoded mode. The middle line of FIG. 15c is the same as FIG. 1, such that the encoded data comprises an 8-bit reference value, sixteen 3-bit size indications (totalling 48 bits), and variable length encoded data values which comprises anywhere between 8 bits and 448 bits. This upper bound (448 bits) was chosen so that: (a) the total max length of the entropy encoded channel (504 bits) is strictly less than the "raw mode" (512 bits), and (b) the total length is aligned at a convenient 8-bit boundary. Alternative maximum lengths could be chosen in different examples if different alignments were to be considered.

Figure 16:
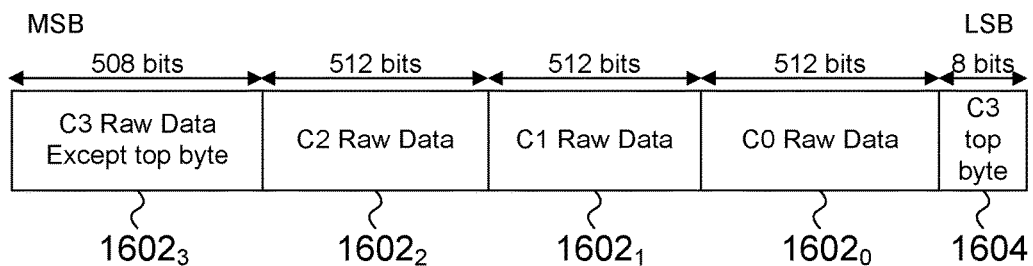
FIG. 16 illustrates an example format of a data packet for a block of pixels using raw data values.

FIG. 16 shows a data packet including data values for a data block, where the data packet comprises raw data (i.e. the header indication in the header 1402 for the block indicates that the data is raw data). In the example described above, the raw data is the post-spatial decorrelation data. The data packet includes the raw data values ($1602_0$ to $1602_3$) for the four channels (C0 to C3) of the data block. It is noted that, in the example shown in FIG. 16, the top byte of the fourth channel is stored in the least significant 8-bits of the data packet (1604), i.e. where the mode indications 1504 are stored in the entropy encoded data packet shown in FIG. 15. This means that the other channel data in the data packet is in the same position as it would be in an entropy encoded data packet. This may allow implementation of a lower cost encoder that operates on each of the channels sequentially, which can avoid having to retain all the compressed data and raw versions, before determining whether the block being compressed needs to be written in a compressed or a raw mode. It is noted that in some other examples, the top byte of the C3 raw data may be stored at the most significant end of the data packet.

Similar data structures to those shown in FIGS. 14 to 16 may be used when different sized/shaped data blocks (e.g. not 8×8 blocks) are encoded and/or when each data value is represented using a different number of bits (e.g. not 8 bits).

A compression process is described above. We will now describe a decompression process for decompressing the data which has been compressed using the techniques described above. FIGS. 4 and 5 described above give a high-level description of how compressed data is decompressed. We now provide more details of how the unpacking module 408, entropy decoding modules 406 and spatial recorrelation modules 404 operate.

The header 1402 of the compressed data is read in order to determine the format of the data. If data is in a constant or raw format it is simple to decode because the data has a known length and predetermined interpretation. However, if a data packet is in an entropy compressed format (as indicated by a header indication in the header 1402) then the data in the data packet has a variable length. In order to unpack the compressed data packet into the appropriate channels (e.g. RGBA), the unpacking module 408 determines the length of each of the channels based on the indications 1506 in the channel packing mode field 1504 and, if channel data is in an entropy encoded form, based on the size indications 1304. The sizes for constant and raw modes in a channel data portion 1502 are trivially 1 byte and 64 bytes respectively.

Figure 17:
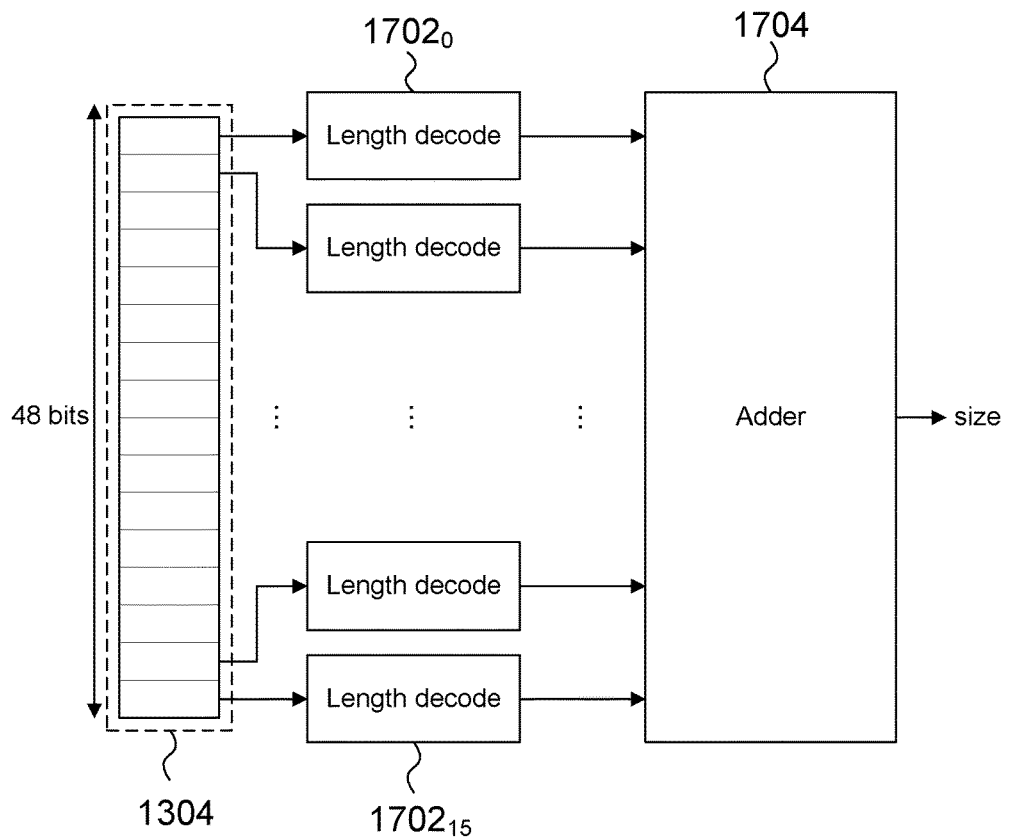
FIG. 17 shows components of an unpacking unit for determining lengths of channels within an encoded data input.

In order to determine the size of a channel data portion 1502 which is entropy encoded, the size indications 1304 for the channel are decoded. The size indications can be decoded in parallel. The number of bits in a channel may be determined in a single clock cycle. FIG. 17 shows an example in which the unpacking module 408 comprises length decode units ($1702_0$ to $1702_{15}$), which are each arranged to receive a respective size indication from the size indication field 1304 for the channel data. In the example described above, each size indication is 3 bits and indicates the number of bits forming the encoded data values for a set (e.g. a 2×2 set of encoded data values), e.g. in accordance with Table 3 given above. The sizes of the data values for the different sets are passed to an adder 1704, which sums the sizes to determine a total size of the encoded data for the channel. The size is output from the adder 1704. Further, in some examples, each of the possible lengths has been restricted to multiples of 4 bits which permits additional savings in the adder logic. Since the length decode units 1702 can operate in parallel, the size of the encoded data for the channel can be determined quickly. When the sizes of the encoded data for the channels in a data packet have been determined, the different channel data portions from the data packet are provided to the respective entropy decoding modules 406.

Figure 18:
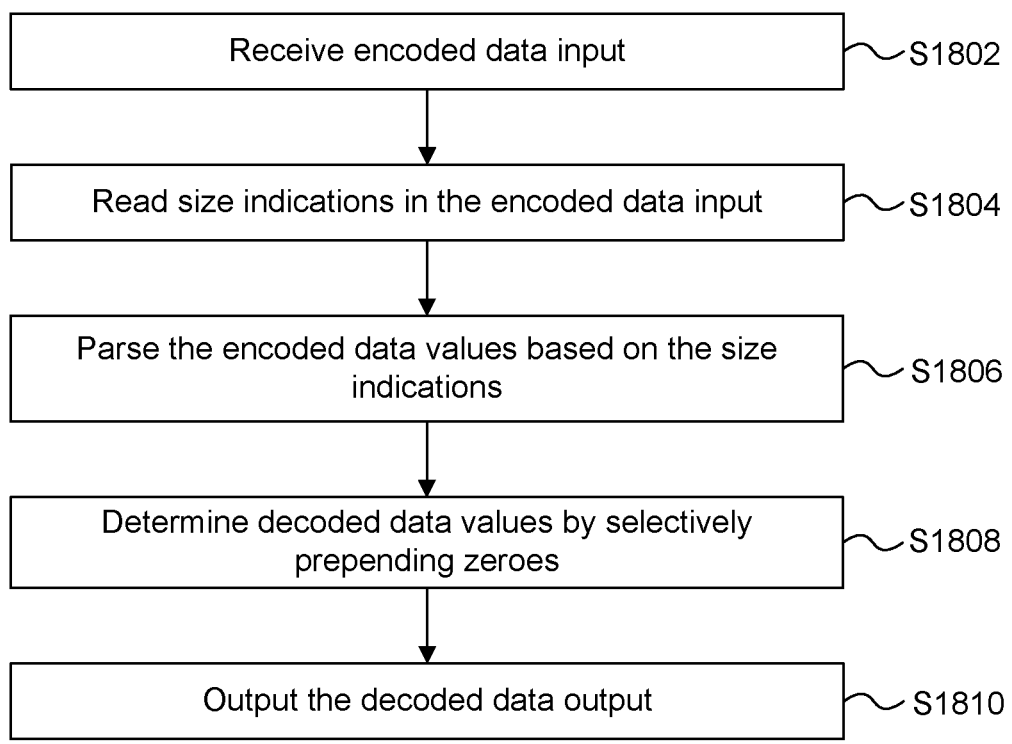
FIG. 18 is a flow chart for a method of performing entropy decoding on an encoded data input.

The operation of each of the entropy decoding modules 406 is described with reference to the flow chart shown in FIG. 18. In step S1802 a block of data for a particular channel is received at an entropy decoding module 406. If the data values are in raw format then the data values bypass the entropy decoding process and the raw data values are output from the entropy decoding module 406 to the corresponding reverse spatial decorrelation module 404. If the data values are in a constant format then the constant value for the block of data values is passed from the entropy decoding module 406 to the corresponding spatial recorrelation module 404 to define the A0" coefficient and zero data values are sent for all other cases. Alternatively, the constant is replicated to all values and the spatial decorrelation is step is bypassed. However, if the received data values are entropy encoded (as indicated by the corresponding mode indication 1506 as shown in FIG. 15b) then the entropy decoding module 406 performs entropy decoding on the received data values, as described below with reference to the steps shown in the flow chart of FIG. 18.

In step S1804 the entropy decoding module 406 reads the indications 1304 in the encoded data input to identify a number of bits forming each of the encoded data values. In the example described above, each size indication is 3 bits and indicates the number of bits forming the encoded data values for a set (e.g. a 2×2 set of encoded data values), e.g. in accordance with Table 3 given above. Then in step S1806 the entropy decoding module 406 parses the encoded data values in the variable length field 1306 of the encoded data input based on the identified numbers of bits to thereby interpret the encoded data values. In step S1808 the entropy decoding module 406 determines decoded data values by selectively prepending leading zeroes to the interpreted encoded data values, e.g. so that each of the decoded data values has n bits (where n may, for example, be 8). For example, if an encoded data value has m bits then (n−m) zeroes are prepended to the encoded data value.

For example, if the size indication for a first 2×2 set of encoded data values indicates that each encoded data value of the set has three bits (i.e. m=3), and the encoded data in the variable length field 1306 starts with the bits: 011100001000, then the encoded data values are parsed (step S1806) to determine the four encoded data values of the set as 011, 100, 001 and 000. In this example, the decoded data values are to have eight bits (i.e. n=8), so five zeroes are prepended to each of the encoded data values (n−m=5), such that the decoded data values are 00000011, 00000100, 00000001 and 00000000.

It is noted that the reference value is outputted from the entropy decoding module without altering the reference value, e.g. to represent the top left value of a block.

In step S1810 the decoded data values are outputted from the entropy decoding module 406. The outputted decoded data values are provided to the corresponding spatial recorrelation modules 404, for each of the channels. The spatial recorrelation modules 404 perform the reverse of the spatial decorrelation described above in relation to FIGS. 6 to 10. Details of an example of the operation of a spatial recorrelation module 404 are described with reference to FIGS. 19 and 20.

Figure 19:
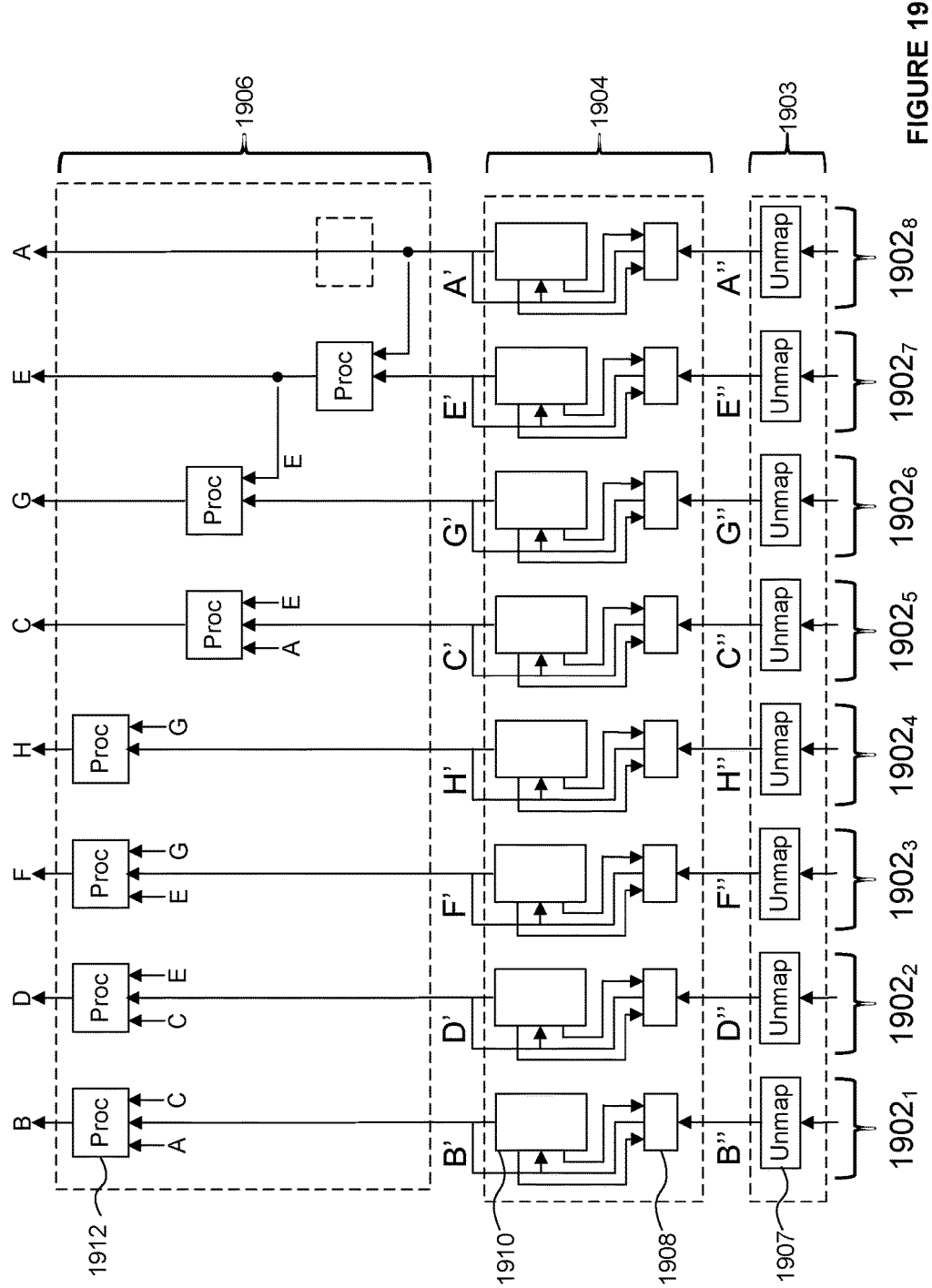
FIG. 19 shows a spatial recorrelation module.

FIG. 19 shows the spatial recorrelation module 404 comprising eight processing pipelines $1902_1$ to $1902_8$. Each processing pipeline 1902 includes an unmapping stage 1903, a first recorrelation stage 1904 and a second recorrelation stage 1906. On each iteration (e.g. each clock cycle), each processing pipeline 1902 receives one of the entropy decoded data values from a row of data values for a block (e.g. an 8×8 block of data values to be spatially recorrelated). For the purposes of the spatial recorrelation module the entropy decoded data values are considered to be spatially decorrelated data values on which spatial recorrelation is to be applied to determine spatially recorrelated data values.

The unmapping stage 1903 of each of the pipelines 1902 comprises an unmapping unit 1907 which applies the reverse of the remapping process applied by the remapping units 618 of the spatial decorrelation module 204 during compression of the data. For example, if the remapping process described above is used (as summarised in Table 1), then the unmapping process may involve the following processes:
  If the least significant bit of a remapped data value is a zero then the unmapping process involves removing the least significant bit (which is a zero) and prepending a zero to the remaining bits of the data value. For example, 00101010 would be unmapped to become 00010101 and 10001000 would be unmapped to become 01000100.
  If the least significant bit of a data value is a one (such that the unmapped data value represents a negative number) then the unmapping process involves removing the least significant bit (which is a one), inverting the remaining bits, and then prepending a one to the bits. For example, 11010101 would be unmapped to become 10010101, and 01110111 would be remapped to become 11000100.

The unmapping process described here is very simple to implement, e.g. in hardware simply by reordering some the bits (e.g. to move the LSB to be in the MSB position), and by optionally inverting (e.g. using XOR operations) the other bits if the LSB is a 1. The unmapped values (A" to H") for a row of data values are passed to the first recorrelation stages 1904.

Each of the first recorrelation stages 1904 includes a processing unit 1908 and a store 1910 for performing spatial recorrelation in the vertical dimension (e.g. over columns). Each of the second stages 1906 includes a processing unit 1912 for performing spatial recorrelation in the horizontal dimension (e.g. over rows). In contrast to the encoding pipelines 604 shown in FIG. 6, there is a dependency chain in the second stages 1906 of the decoding pipelines 1902, whereby the second stages 1906 of some of the pipelines 1902 use the results of the second stages 1906 of other pipelines 1902, as described in more detail below.

Figure 20:
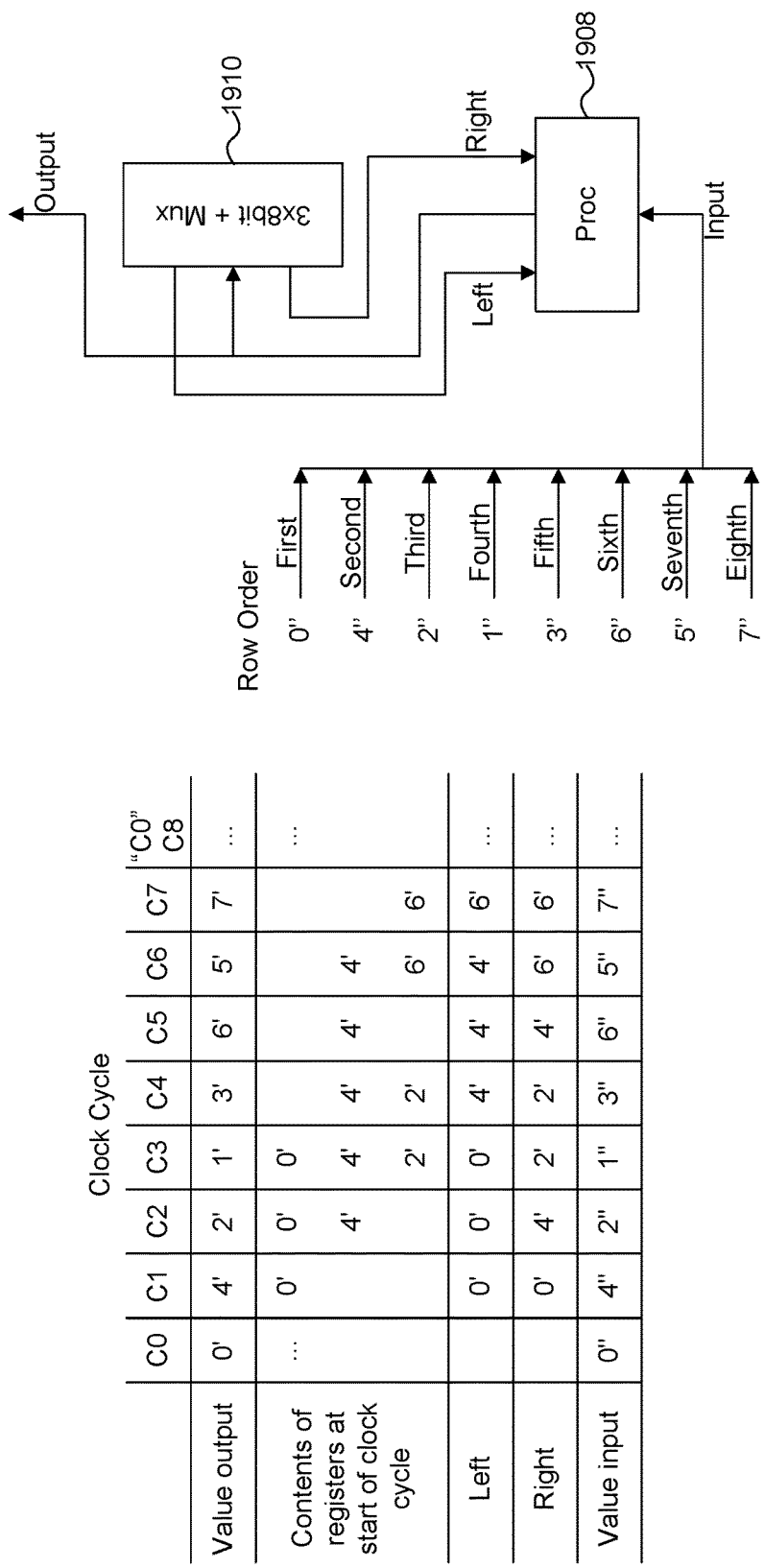
FIG. 20 illustrates the operation of a stage of a processing pipeline of the spatial recorrelation module.

FIG. 20 illustrates the operation of the first recorrelation stage 1904 of one of the processing pipelines 1902 over eight iterations to thereby output first coefficients to the respective second recorrelation stages 1906 for an 8×8 block of incoming spatially decorrelated, unmapped data values. The first recorrelation stages 1904 of the spatial recorrelation module 404 perform the inverse of the operations performed by the second stages 608 of the corresponding spatial decorrelation module 204. The rows of a block of spatially decorrelated, unmapped data values are input to the parallel processing pipelines 1902 in an order such that after a first one of the rows has been received by the first recorrelation stages 1904 and stored in the registers 1910, the first coefficients of each subsequent row of the block that is received at the first recorrelation stages 1904 can be determined based on the stored first coefficients in the registers 1910. For example, as described in more detail below, the rows of an 8×8 block of spatially decorrelated, unmapped data values may be supplied to the processing pipelines 1902 in the order: row 0, row 4, row 2, row 1, row 3, row 6, row 5 and then row 7. Similarly to as described above with reference to the spatial decorrelation, the order in which the rows are processed for the spatial recorrelation may be different in different examples, but preferably satisfies the dependency tree shown in FIG. 10. To give some other examples, the order in which rows are processed for spatial recorrelation could be 0, 4, 2, 3, 1, 6, 7, 5; or 0, 4, 6, 5, 7, 2, 1, 3; or 0, 4, 6, 7, 5, 2, 3, 1.

It can be seen that the processing unit 1908 has three inputs labelled "Input", "Left" and "Right" in FIG. 20, whereby the spatially decorrelated, unmapped data values are received on the Input line, whereas the left and right inputs are coupled to outputs of the registers 1910. On a first clock cycle (clock cycle C0), the first stages 1904 of the pipelines 1902 receive the spatially decorrelated, unmapped data values for row 0 (the spatially decorrelated, unmapped data value input to the first recorrelation stage 1904 is indicated in FIG. 20 by a double prime: 0") and output the first coefficients for row 0 (the value output from the first recorrelation stage 1904 is indicated in FIG. 20 by a single prime: e.g. 0'), wherein the storage units 1910 store the first coefficients for row 0 (i.e. following clock cycle C0, the registers 1910 store the first coefficients for row 0, denoted 0').

On a second clock cycle (clock cycle C1), the first stages 1904 of the pipelines 1902 receive the spatially decorrelated, unmapped data values for row 4 (the spatially decorrelated, unmapped data value input to the first stage 1904 is 4") and output the first coefficients for row 4 (the value output from the first recorrelation stage 1904 is 4'). That is, the processing unit 1908 receives 4" on the Input line and receives 0' on the left and right inputs, such that the first coefficients for row 4 (denoted 4') are determined by the processing units 1908 based on the received spatially decorrelated, unmapped data values for row 4 (denoted 4") and the stored first coefficients for row 0 (denoted 0', retrieved from the registers 1910). As described above, in the spatial decorrelation, the spatially decorrelated values for row 4 are determined as $$4''=4'-0' \bmod 2^8,$$

rearranging this we get:

$$4'=4''+0' \bmod 2^8.$$

The processing unit 1908 uses this equation to determine the values denoted 4' based on the input values of 4" and the stored first coefficients 0'. Following clock cycle C1 the storage units store the first coefficients for rows 0 and 4 (denoted 0' and 4').

On a third clock cycle (clock cycle C2), the first stages 1904 of the pipelines 1902 receive the spatially decorrelated, unmapped data values for row 2 (the value input to the first stage 1904 is 2") and output the first coefficients for row 2 (the value output from the first stage 1904 is 2'). That is, the processing unit 1908 receives 2" on the Input line and receives 0' on the left input and receives 4' on the right input, such that the first coefficients for row 2 (denoted 2') are determined by the processing units 1908 based on the received spatially decorrelated, unmapped data values for row 2 (denoted 2") and the stored first coefficients for rows 0 and 4 (denoted 0' and 4', retrieved from the registers 1910). As will be apparent, the values 2' are determined according to the equation:

$$2' = 2'' + L\text{Predict}(0', 4') \bmod 2^8.$$

Following clock cycle C2 the registers 1910 store the first coefficients for rows 0, 4 and 2, denoted 0', 4' and 2'). It is noted that the assignments to "left" and "right" can be swapped as the outcome of the "Proc" operation will be unaffected. However, from a "power" perspective in a semiconductor implementation, it is preferable that the values change as little as possible from clock cycle to cycle. For example, in clock cycles C2 and C3 the LR assignments are (0',4') and (0',2') respectively, Although modifying clock cycle C3's assignment to (2',0') would produce the exactly the same result, it is likely to use more energy due to a greater number of voltage swings in the logic as the 0' input is switched from the left input to the right input.

As will be apparent, on a fourth clock cycle (clock cycle C3), the first stages 1904 of the pipelines 1902 receive the spatially decorrelated, unmapped data values for row 1 (denoted 1") and output the first coefficients for row 1 (denoted 1'). That is, the processing unit 1908 receives 1" on the Input line and receives 0' on the left input and receives 2' on the right input. The values 1' are determined according to the equation: $1' = 1'' + L\text{Predict}(0', 2') \bmod 2^8$. Following clock cycle C3 the registers 1910 store the first coefficients for rows 4 and 2, denoted 4' and 2'). The first coefficient for row 0 (denoted 0') may be discarded because it is not needed for subsequent rows, but it may be simpler to leave 0' in the registers 1910 until it is overwritten.

As will be apparent, on a fifth clock cycle (clock cycle C4), the first stages 1904 of the pipelines 1902 receive the spatially decorrelated, unmapped data values for row 3 (denoted 3") and output the first coefficients for row 3 (denoted 3'). That is, the processing unit 1908 receives 3" on the Input line, receives 4' on the left input and receives 2' on the right input. The values 3' are determined according to the equation: $3' = 3'' + L\text{Predict}(4', 2') \bmod 2^8$. Following clock cycle C4 the registers 1910 store the first coefficient for row 4, denoted 4'). The first coefficient for row 2 (denoted 2') may be discarded because it is not needed for subsequent rows, but it may be simpler to leave 2' in the registers 1910 until it is overwritten.

The operation of the first stages 1904 on the sixth, seventh and eighth clock cycles will be apparent from FIG. 20 and will follow the same principles as described above for first five clock cycles, and so for conciseness we will not explain the operation in these clock cycles in detail here. It is noted that the storage unit 1910 of each of the first stages 1904 of the processing pipelines 1902 is configured to store up to three first coefficients, and this is sufficient for the processing of all of the rows in the first stages 1904 due to the order in which the rows are input to the spatial recorrelation module 404. As noted above, in general, each of the registers 1910 will have the capacity to store up to $\lceil \log_2 r \rceil$ first coefficients at any given time, where r is the number of rows in the block of spatially decorrelated data values.

Therefore, in each iteration, a row of first coefficients (labelled A' to H' in FIG. 19) is provided to the respective second recorrelation stages 1906 of the processing pipelines 1902. The second stages 1906 of the spatial recorrelation module 404 perform the inverse of the operations performed by the first stages 606 of the corresponding spatial decorrelation module 204.

As described above in the spatial decorrelation, the data values of column A are the same as the first coefficients for column A, i.e. A'=A. Therefore, in the corresponding spatial recorrelation, the first coefficients for column A received at the second stage 1906 of the processing pipeline $1902_8$ are unchanged on the output of the second stage 1906, i.e. A=A'.

However, as described above in the spatial decorrelation, for column E, the first coefficient E' is given by the equation: $E' = E - A \bmod 2^8$, which can be written as $E' = \bmod_{2^8}(E - A)$ to more clearly show the operation of the mod function. Since A=A', we can arrange the equation to give $E = \bmod_{2^8}(E' + A')$. Therefore, the processing unit 1912 in the processing pipeline $1902_7$ outputs the spatially decorrelated data values for column E according to this equation using inputs of A' and E'.

Furthermore, as described above in the spatial decorrelation, for column G, the first coefficient G' is given by the equation: $G' = \bmod_{2^8}(G - \text{md } E)$. The equation can be re-arranged to give $G = \bmod_{2^8}(G' + E)$. Therefore, the processing unit 1912 in the processing pipeline $1902_6$ outputs the spatially decorrelated data values for column G according to this equation using inputs of E and G', wherein the value of E is provided from the output of the processing unit 1912 in processing pipeline $1902_7$. In other embodiments the calculation of E may be repeated (or combined into a single evaluation, such as $G = \bmod_{2^8}(G' + E' + A)$) in the processing unit 1912 of the processing pipeline $1902_6$ (as well as in processing pipeline $1902_7$) such that the processing pipeline $1902_6$ does not rely on the output of the processing pipeline $1902_7$. In these other embodiments the processing unit 1912 of the processing pipeline $1902_6$ may receive the A and E' values as inputs as well as the G' value.

Furthermore, as described above in the spatial decorrelation, for column C, the first coefficient C' is given by the equation: $C' = \bmod_{2^8}(C - L\text{Predict}(A, E))$. Using the definition of LPredict given above, the equation can be re-arranged to give:

$$C = \bmod_{2^8}\left(C' + \left\lceil \frac{A+E}{2} \right\rceil + \begin{cases} 2^7, & \text{if } |E - A| \geq 2^7 \\ 0, & \text{otherwise} \end{cases}\right).$$

Therefore, the processing unit 1912 in the processing pipeline $1902_5$ outputs the spatially decorrelated data values for column C according to this equation using inputs of A, C' and E, wherein the value of A is provided from the output of the first stage 1904 of the processing pipeline $1902_8$, and the value of E is provided from the output of the processing unit 1912 in processing pipeline $1902_7$. In other embodiments the calculation of E may be repeated (or combined into a single evaluation for calculating C) in the processing unit 1912 of the processing pipeline $1902_5$ (as well as in processing pipeline $1902_7$) such that the processing pipeline $1902_5$ does not rely on the output of the processing pipeline $1902_7$, in which case the processing unit 1912 of the processing pipeline $1902_5$ may receive the E' value as an input as well as the A and C' values.

Furthermore, as described above in the spatial decorrelation, for column B, the first coefficient B' is given by the equation: B'=$\text{mod}_{2^8}$(B−LPredict(A,C)). The equation can be re-arranged to give:

$$B = \text{mod}_{2^8}\left(B' + \left\lceil\frac{A+C}{2}\right\rceil + \begin{cases} 2^7, & \text{if } |C-A| \geq 2^7 \\ 0, & \text{otherwise} \end{cases}\right).$$

Therefore, the processing unit 1912 in the processing pipeline $1902_1$ outputs the spatially decorrelated data values for column B according to this equation using inputs of A, B' and C. The value of A is provided from the output of the first stage 1904 of the processing pipeline $1902_8$, and the value of C is provided from the output of the processing unit 1912 in processing pipeline $1902_5$. In other embodiments the calculation of C may be repeated (or combined into a single evaluation for calculating B) in the processing unit 1912 of the processing pipeline $1902_1$ (as well as in processing pipeline $1902_5$) such that the processing pipeline $1902_1$ does not rely on the output of the processing pipeline $1902_5$, in which case the processing unit 1912 of the processing pipeline $1902_1$ may receive the C' and E' values as inputs as well as the A and B' values.

Furthermore, as described above in the spatial decorrelation, for column D, the first coefficient D' is given by the equation: D'=$\text{mod}_{2^8}$(D−LPredict(C,E)). The equation can be re-arranged to give:

$$D = \text{mod}_{2^8}\left(D' + \left\lceil\frac{C+E}{2}\right\rceil + \begin{cases} 2^7, & \text{if } |C-E| \geq 2^7 \\ 0, & \text{otherwise} \end{cases}\right).$$

Therefore, the processing unit 1912 in the processing pipeline $1902_2$ outputs the spatially decorrelated data values for column D according to this equation using inputs of C, D' and E. The value of C is provided from the output of the processing unit 1912 in processing pipeline $1902_5$, and the value of E is provided from the output of the processing unit 1912 in processing pipeline $1902_7$. In other embodiments the calculation of C may be repeated (or combined into a single evaluation for calculating D) in the processing unit 1912 of the processing pipeline $1902_2$ (as well as in processing pipeline $1902_5$) such that the processing pipeline $1902_2$ does not rely on the output of the processing pipeline $1902_5$. Furthermore, in these other embodiments, the calculation of E may be repeated in the processing unit 1912 of the processing pipeline $1902_2$ (as well as in processing pipeline $1902_7$) such that the processing pipeline $1902_2$ does not rely on the output of the processing pipeline $1902_7$. In these other embodiments the processing unit 1912 of the processing pipeline $1902_2$ may receive the A, C' and E' values as inputs as well as the D' value.

Furthermore, as described above in the spatial decorrelation, for column F, the first coefficient F' is given by the equation: F'=$\text{mod}_{2^8}$(F−LPredict(E,G)). The equation can be re-arranged to give:

$$F = \text{mod}_{2^8}\left(F' + \left\lceil\frac{E+G}{2}\right\rceil + \begin{cases} 2^7, & \text{if } |E-G| \geq 2^7 \\ 0, & \text{otherwise} \end{cases}\right).$$

Therefore, the processing unit 1912 in the processing pipeline $1902_3$ outputs the spatially decorrelated data values for column F according to this equation using inputs of E, F' and G. The value of E is provided from the output of the processing unit 1912 in processing pipeline $1902_7$, and the value of G is provided from the output of the processing unit 1912 in processing pipeline $1902_6$. In other embodiments the calculation of E may be repeated (or combined into a single evaluation for calculating F) in the processing unit 1912 of the processing pipeline $1902_3$ (as well as in processing pipeline $1902_7$) such that the processing pipeline $1902_3$ does not rely on the output of the processing pipeline $1902_7$. Furthermore, in these other embodiments, the calculation of G may be repeated in the processing unit 1912 of the processing pipeline $1902_3$ (as well as in processing pipeline $1902_6$) such that the processing pipeline $1902_3$ does not rely on the output of the processing pipeline $1902_6$. In these other embodiments the processing unit 1912 of the processing pipeline $1902_3$ may receive the A, E' and G' values as inputs as well as the F' value.

Furthermore, as described above in the spatial decorrelation, for column H, the first coefficient H' is given by the equation: H'=$\text{mod}_{2^8}$(H−G). The equation can be re-arranged to give H=$\text{mod}_{2^8}$(H'+G). Therefore, the processing unit 1912 in the processing pipeline $1902_4$ outputs the spatially decorrelated data values for column H according to this equation using inputs of G and H', wherein the value of G is provided from the output of the processing unit 1912 in processing pipeline $1902_6$. In other embodiments the calculation of G may be repeated (or combined into a single evaluation for calculating H) in the processing unit 1912 of the processing pipeline $1902_4$ (as well as in processing pipeline $1902_6$) such that the processing pipeline $1902_4$ does not rely on the output of the processing pipeline $1902_6$. In these other embodiments the processing unit 1912 of the processing pipeline $1902_4$ may receive the A and E' values as inputs as well as the H' value.

In this way, the spatial recorrelation module 404 can determine a row of spatially recorrelated data values on each of a plurality of iterations (e.g. clock cycles). For example, an 8×8 block of data values can be determined in eight iterations.

As described above, in some examples, colour recorrelation is then performed by the colour recorrelation modules 402 on the data values of the R, G and B channels output from the spatial recorrelation modules 404, to thereby obtain the decompressed data values. It is noted that some other examples do not have a colour recorrelation stage or bypass it.

The description above relates primarily to encoding and decoding 8×8 blocks of pixel values wherein the pixel values each have 32 bits and are in an ARGB 8:8:8:8 format such that they comprise 8-bit data values for each of the four channels (Alpha, Red, Green and Blue). As described in more detail below, in other embodiments, the data values may have different formats.

Multisample Anti Aliasing

Multisample antialiasing (MSAA) is a technique which can be used to improve image quality, e.g. by reducing aliasing artefacts. The scene is supersampled such that for each pixel, more than one sample is rendered, and the resulting rendered samples can be down-sampled to generate the pixels to be displayed on a display. Different MSAA modes exist and can involve sampling different numbers of samples per pixel, e.g. 2 or 4 samples per pixel are common MSAA modes. For example, a first of the sample positions per pixel can be encoded and decoded as described above as a reference image, but the other sample positions per pixel can be processed as "MSAA delta images", wherein the data values of the MSAA delta images are given as delta values (i.e. differences) compared to the corresponding values of the reference image. In other words, the data values represent MSAA differential data values. Typically, the differences between different MSAA samples within the same pixel will be small in magnitude. As such the spatial decorrelation (and corresponding spatial recorrelation) processes are not performed on the data values of the MSAA delta images. However, the remapping and unmapping processes are still performed so that the data values are in an unsigned format with a distribution biased towards zero (since this improves the efficiency of the entropy encoding stage).

Figures 21, 22:
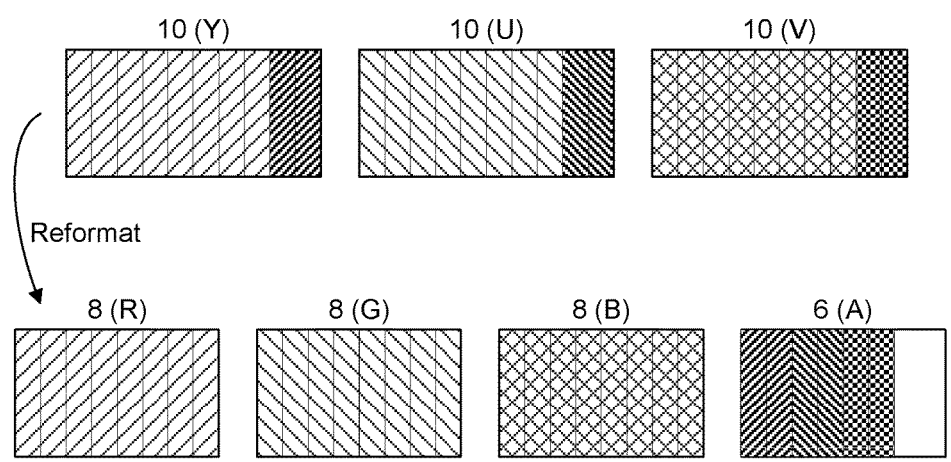
FIG. 21 illustrates a block of MSAA differential data values to be entropy encoded.
FIG. 22 illustrates how three 10-bit channels can be reformatted into four channels.

The entropy encoding for the reference image is performed as described above. However, the entropy encoding is slightly different for the MSAA delta images because all of the data values (including the top left data value of a block) are small in magnitude. FIG. 21 shows an 8×8 block of data values from an MSAA delta image. Since spatial decorrelation has not been performed on the data values, the ordering of the rows is A, B, C, D, E, F, G, H and the ordering of the columns is 0, 1, 2, 3, 4, 5, 6, 7. The top left 2×2 set of the block can be encoded in the same manner as the other sets in the block. Since no reference value is stored for a block of data values from an MSAA delta image, an extra byte of data can be used for the encoded data values in the data for a channel. For example, with reference to FIG. 13, the reference value field 1302 is not used for a block of an MSAA delta image, and the variable length field 1306 can have between 1 and 57 bytes of data. MSAA delta images still use 48 bits for the size indications (1304), i.e. 3 bits per 2×2 set of data values to indicate the size of the encoded data values in the set.

In some systems, if all of the differential data values in a block of a MSAA delta image are zero (i.e. if a sample position set is the same as the reference sample position set for the block of pixels) then an indicator could be set to indicate this situation (e.g. setting the transparent black flag). This would reduce the amount of data used to represent this situation, which is not uncommon.

The decoding of the data values of an MSAA delta image should be apparent from the description above. The entropy decoding happens in the same manner, taking into account the fact that the block of encoded data values does not include a reference value such that the top left set includes 4 encoded data values. The data values of the reference image are spatially recorrelated, but the data values of the MSAA delta images are not spatially recorrelated (because they were not spatially decorrelated during compression).

10-Bit Data Values

In some embodiments, each data value has 10 bits (rather than 8 bits as in the examples described above). However, the system described above can be used to compress/decompress 10-bit data values without substantial modifications to the entropy encoding/decoding or the spatial decorrelation/recorrelation processes. The unpacking process may be modified in order to correctly process 10-bit values using hardware which is designed for processing 8-bit values.

For example, a YUV video format may use 10-bit data values for each of the three channels (Y, U and V channels). So, in this example, a pixel is represented by 30 bits in a YUV 10:10:10 format. YUV is just given as an example format, but there are other formats which use 10-bit data values. The system described above is arranged to process four channels of 8-bit data values per pixel. The three 10-bit data values can be reformatted into four 8-bit channels. When YUV data is processed, the colour decorrelation and colour recorrelation blocks can be omitted or bypassed, and can replaced/supplemented by processing blocks which perform the reformatting of the data values from three input channels into four output channels, and vice versa. FIG. 22 shows an example in which three 10-bit data values, for YUV channels, are reformatted into four channels which can be treated as RGBA channels using the system described above. The eight most significant bits of data values of a first input channel (e.g. denoted $Y_9$ to $Y_2$) are placed in a first output channel (e.g. R), the eight most significant bits of data values of a second input channel (e.g. denoted $U_9$ to $U_2$) are placed in a second output channel (e.g. G), the eight most significant bits of data values of a third input channel (e.g. denoted $V_9$ to $V_2$) are placed in a third output channel (e.g. R), and the two least significant bits from data values of each of the input channels are placed in a fourth output channel (e.g. A). Therefore the fourth output channel includes six of the input bits. The six bit data values for the fourth channel can be constructed by interleaving the two least significant bits from each of the three input channels (e.g. denoted $Y_1$, $U_1$, $V_1$, $Y_0$, $U_0$, $V_0$). There is often a higher degree of spatial correlation between the most significant bits of nearby pixel values than the spatial correlation between the least significant bits of nearby pixel values. Therefore, by keeping the most significant bits within the same channel data (e.g. the eight most significant bits of the three input channels form three respective channel data values) a high degree of spatial correlation is likely to be present in those data values. This leads to greater compression than if the least significant bits were kept within the same channel data. The fourth output channel, which includes the least significant bits of the input channels ($Y_1$, $U_1$, $V_1$, $Y_0$, $U_0$, $V_0$) is likely to display less spatial correlation than the other output channels.

Figure 23A:
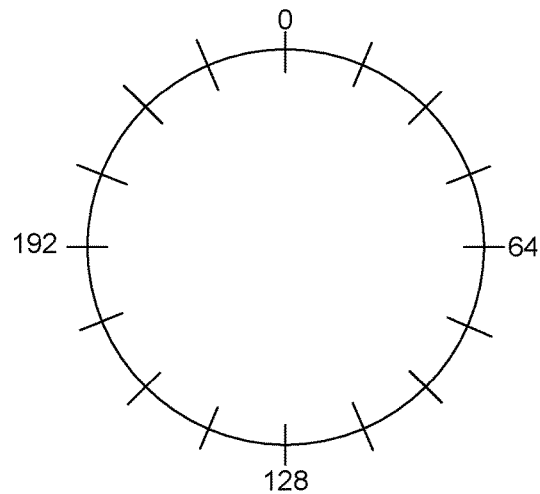
FIG. 23a illustrates the distribution of data values when two zeroes are appended to the least significant end of 6-bit data values.

The first three 8-bit channels can be processed as described above. However, since the fourth channel includes only 6 bits of data it is processed slightly differently. The processing block which reformats the data can add (i.e. append) two zero bits to the least significant end of the data in the further output channel to pad the data up to eight bits, such that it can be processed using the system described above which is designed to operate on 8-bit data values. Adding the padding bits to the least significant portion of the data means that each of the (now 8-bit) values is a multiple of 4. Each data value is formed from the bits $Y_1U_1V_1Y_0U_0V_000$. Furthermore, adding the padding bits means that the data values are distributed over the range 0 to 255, e.g. as represented in FIG. 23a. Since each representable data value is a multiple of four, the representable data values are spread over the range from 0 to 255. This is useful because the spatial decorrelation and spatial recorrelation functions described above involve the function mod $2^8$, which takes the modulo-256 of values. By padding the 6-bit data values up such that they are distributed across the range from 0 to 255, no modifications need to be made to the modulo function (which may be set in hardware functionality of the spatial decorrelation and spatial recorrelation function) which is designed to operate on 8-bit values.

Figure 23B:
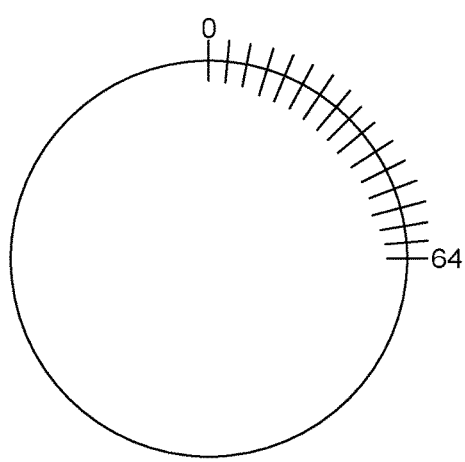
FIG. 23b illustrates the distribution of data values when two zeroes are prepended to the most significant end of 6-bit data values.

It is noted that if the padding bits were added to the most significant portion of the 6-bit data values then the 8-bit data values would be limited to the range 0 to 63 (i.e. from 0 to $2^6$), as represented in FIG. 23b. Taking the modulo-256 of these values would then not provide good compression.

Figure 23C:
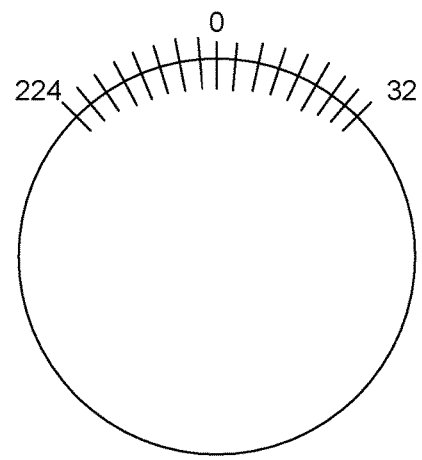

When performing spatial decorrelation on the 6-bit data values, the LPredict function (as defined in equation 3 above) is modified so that the two LSBs of the resulting values remain zero. It is noted that since all of the 6-bit data values are multiples of 4, the result of the LPredict function is an even number, such that the LSB (i.e. "bit 0") of the resulting value is a zero. In other words, the average of two multiples of four is an even number. However, the second least significant bit ("bit 1") could be a one or a zero in the result of the LPredict function defined above, so a modification is made so that bit 1 is a zero. This could be achieved by simply forcing 'bit 1' of the output to zero. Alternatively, this could be achieved by shifting the inputs and outputs of the 'ceiling' operator in the LPredict function. This modification then guarantees that the resulting coefficient values from the LPredict and Haar functions will also have their two LSBs as zero. After the decorrelation process, the spatial decorrelation module may perform a signed right shift by 2 bits prior to the 'remap' stage 609 to reduce the range of the values to further improve compression in the entropy encoding stage. For example, if a spatially-decorrelated data value has bits $X_5X_4X_3X_2X_1X_000$, then performing a signed right shift by 2 bits results in $X_5X_5X_5X_4X_3X_2X_1X_0$. This shift converts the data values from being multiples of 4 within the range from 0 to 255 as shown in FIG. 23a, to being integer values in the range from −32 (which is equivalent to an unsigned value of 224 using the modulo 256 arithmetic described herein) to +31 as shown in FIG. 23c. Data values in this format are well-suited for the remapping stage 609 described above to produce values which will be efficiently compressed by the entropy encoding process described above.

In the example described above, 6-bit data values are compressed using a spatial decorrelation module and an entropy encoding module which are arranged to process 8-bit data values. More generally, there can be provided a method of (and data compression unit for) compressing m-bit data values using a spatial decorrelation module which is arranged to process n-bit data values and an entropy encoding module which is arranged to process n-bit data values, where m<n. The general method comprises:

appending (n−m) bits to the least significant end of the m-bit data values, thereby forming n-bit data values;

using the spatial decorrelation module to perform a spatial decorrelation process on the n-bit data values involving using a modulo-$2^n$ function; and using the entropy encoding module to perform entropy encoding on the data values subsequent to said spatial decorrelation. A processing block can be provided which is configured to perform the appending of the (n−m) bits to the least significant end of the m-bit data values.

According to this method, the modulo-$2^n$ function operates correctly to provide good spatial decorrelation even though the input data values have only m bits, where m<n.

For example, the (n−m) bits which are appended to the least significant end of the m-bit data values may be (n−m) zeroes.

The general method may further comprise remapping the data values subsequent to said spatial decorrelation but prior to said entropy encoding, wherein the entropy encoding is performed on the remapped data values. The general method may further comprise performing a signed right shift by (n−m) bits on the spatially decorrelated data values, prior to said remapping. The signed right shift provides data values to the remapping stage which can be remapped in the same manner as n-bit data values (it is noted that the compression unit is arranged for compressing n-bit data values), to provide values which can be efficiently encoded by the entropy encoding module. In particular, as described above, the remapping can be configured in accordance with the spatial decorrelation process performed by the spatial decorrelation module such that the likelihood of remapped data values having particular magnitudes decreases for larger magnitudes. In the examples described herein, the remapped data values are in an unsigned integer format, and are unsigned with a distribution which is biased towards zero.

Furthermore, the spatial decorrelation module may be configured such that the (n−m) least significant bits of the spatially decorrelated data values are zeroes. This is so that the signed right shift by (n−m) bits loses zeroes rather than ones.

A corresponding decompression process can be applied to decompress compressed data value to determine m-bit decompressed data values using hardware that is designed to operate on n-bit data values (e.g. where m=6 and n=8). In particular, there is provided a method of (and data decompression unit for) decompressing compressed data values to determine m-bit decompressed data values, where the method comprises:

performing entropy decoding on entropy encoded data values at an entropy decoding module which is arranged to generate n-bit entropy decoded data values, where m<n; and performing, at a spatial recorrelation module, spatial recorrelation on n-bit data values involving using a modulo-$2^n$ function, subsequent to said entropy decoding;

wherein the m-bit decompressed data values are represented by the m most significant bits of the n-bit spatially recorrelated data values.

The method may further comprise removing (n−m) bits from the least significant end of the n-bit spatially recorrelated data values, thereby forming the m-bit decompressed data values. This can be done by a processing block which replaces the colour recorrelation block described above.

The spatial recorrelation module may be configured to apply an unmapping process to the n-bit data values prior to performing said spatial recorrelation. Furthermore, the spatial recorrelation module may be configured to apply a left shift by (n−m) bits on the unmapped data values, prior to said spatial recorrelation. The (n−m) least significant bits of the shifted data values may be set to be the same for each data value (e.g. all set to be zeroes) so that the shifted data values are evenly distributed over the range from 0 to $2^n-1$. For example, m may be 6 and n may be 8, such that (n−m) is 2 and such that $2^n-1$ is 255.

With reference to the YUV example described above, the 6-bit decompressed data values are included in one channel, and there are three other channels which have 8-bit decompressed data values. The data values in the channels are reformatted (e.g. by the processing block which replaces the colour recorrelation block) to represent YUV data values having three output data channels in a 10:10:10 format. The 8-bit decompressed data values are placed into the eight most significant bit positions of 10-bit data values of the three output data channels; and each of the 6-bit data values is divided into three 2-bit portions, wherein the 2-bit portions are placed into the two least significant bit positions of the 10-bit data values of the respective three output data channels. As described above the bits in the 6-bit data value may be interleaved from the three different YUV channels, so a de-interleaving process may be used to assign the correct decompressed bits from the 6-bit data values to the correct YUV channels. The decompressed data values can be outputted.

Different Blocks Sizes/Shapes

In the examples described above, the blocks are 8×8 blocks. However, in different examples, different sized/shaped blocks could be used, such as 8×4, 16×4, 32×2 and 16×16 blocks. Here we describe how very slight modifications to the system described above for 8×8 blocks can allow a system to process 16×4 and 32×2 blocks.

In general, there is provided a method of (and a data compression unit for) performing spatial decorrelation on a j×k input block of data values using a spatial decorrelation module which is arranged to process g×h blocks of data values (where the blocks have g columns and h rows, e.g. 8×8 blocks of data values, where g=h=8), wherein the number of columns, j, in the input block of data values is a multiple of g, and wherein j×k=g×h. The method comprises:
    reorganising the input block of data values into a g×h block (e.g. an 8×8 block) of data values by: (i) dividing each of the rows of the input block into a plurality sections, wherein each section comprises g data values, and (ii) arranging the sections into h rows to form a g×h block of data values; and
    performing spatial decorrelation on the g×h block of data values, wherein the rows of the g×h block of data values are processed (e.g. iteratively) in an order such that, for each row of the input block of data values, a first section of that row is processed in an earlier iteration to that in which a second section of that row is processed, wherein the first section is to the right of the second section in the row, and wherein at least one value from the first section is saved for use in the spatial decorrelation of the second section.

In the examples described herein g=h=8 such that the system is arranged to process 8×8 blocks, but in other examples, different sized/shaped blocks may be processed. For example, in some other examples, g=h=4, such that the system is arranged to process 4×4 blocks. In other examples, the blocks may be rectangular, i.e. g # h, e.g. g=8, h=4.

For example, the input data blocks may be 16×4 data blocks (i.e. j=16 columns and k=4 rows), such that (where g=h=8) each of the rows of the input block is divided into two sections. As another example, the input data blocks may be 32×2 data blocks (i.e. j=32 and k=2), such that each of the rows of the input block is divided into four sections.

As described in more detail below with reference to the 16×4 and 32×2 examples, a data value from column A of the first section can be saved, and used to compute the spatially decorrelated data values in columns E, G and H of the second section using a Linear prediction method which uses two reference values. Furthermore, the data value from column A of the first section can be used to compute a spatially decorrelated data value in column A of the second section using a Haar prediction method which uses one reference value.

The spatially decorrelated data values can be outputted from the spatial decorrelation module, and for example provided to an entropy encoding module for entropy encoding. The spatial decorrelation module may be configured to remap the data values subsequent to said spatial decorrelation but prior to providing the spatially decorrelated data values to the entropy encoding module, such that the entropy encoding is performed on the remapped data values. As described above, the remapped data values may be unsigned, with a distribution which is biased towards zero.

It is noted that, in these compression examples, j>g, (i.e the source block is wider than the target block). However, input blocks where j<g could be handled by the same system if a pre-processing stage is introduced to transpose/rotate the input block, such that the rows of the input block become columns, and vice versa. The transposed block (which has j>g) can be processed as described in the examples herein.

Furthermore, there is provided a method of (and a data decompression unit for) performing spatial recorrelation on a g×h input block of data values (e.g. an 8×8 input block of data values, where g=h=8) and outputting a j×k output block of spatially recorrelated data values, wherein the number of columns, j, in the output block of data values is a multiple of g, wherein j×k=g×h, and wherein j≠g. The method comprises:
    performing spatial recorrelation on the g×h input block of data values, wherein the rows of the g×h input block of data values correspond to sections of rows of the j×k output block of data values, and wherein the rows of the input block of data values are processed iteratively in an order such that a first row of the input block of data values corresponding to a first section of a particular row of the output block is processed in an earlier iteration to that in which a second row of the input block of data values corresponding to a second section of the particular row of the output block is processed, wherein the first section is to the right of the second section in the particular row of the output block, and wherein at least one value from the first row of the input block of data values is saved for use in the spatial recorrelation of the second row of the input block of data values;
    reorganising the spatially recorrelated data values into the j×k output block of spatially recorrelated data values by arranging the rows of spatially recorrelated data values into their corresponding sections in the k rows of the output block; and
    outputting the j×k output block of spatially recorrelated data values.

As described above, in the examples described herein g=h=8, but g and h could take different values in other examples.

In the 16×4 block example, j=16 and k=4, such that (where g=h=8) each of the rows of the output block comprises two sections. In the 32×2 block example, j=32 and k=2, such that each of the rows of the output block comprises four sections.

A data value from column A of the first row of the input block may be saved, and used to compute the spatially recorrelated data values in columns E, G and H of the second row of the input block based on a Linear prediction method which uses two reference values. Furthermore, the data value from column A of the first row of the input block may be used to compute a spatially recorrelated data value in column A of the second row of the input block based on a Haar prediction method which uses one reference value.

As in the examples described above, the data values of the input data block may be received at the spatial recorrelation module from an entropy decoding module which has applied entropy decoding to the data values.

It is noted that, in these decompression examples, j>g, (i.e the output block is wider than the input block). However, output blocks where j<g could be handled by the same system if a post-processing stage is introduced to transpose/rotate the output block, such that the rows of the output block become columns, and vice versa. The output block (which has j>g) can be generated as described in the examples herein and then transposed into an output block having j<g.

Figure 24:
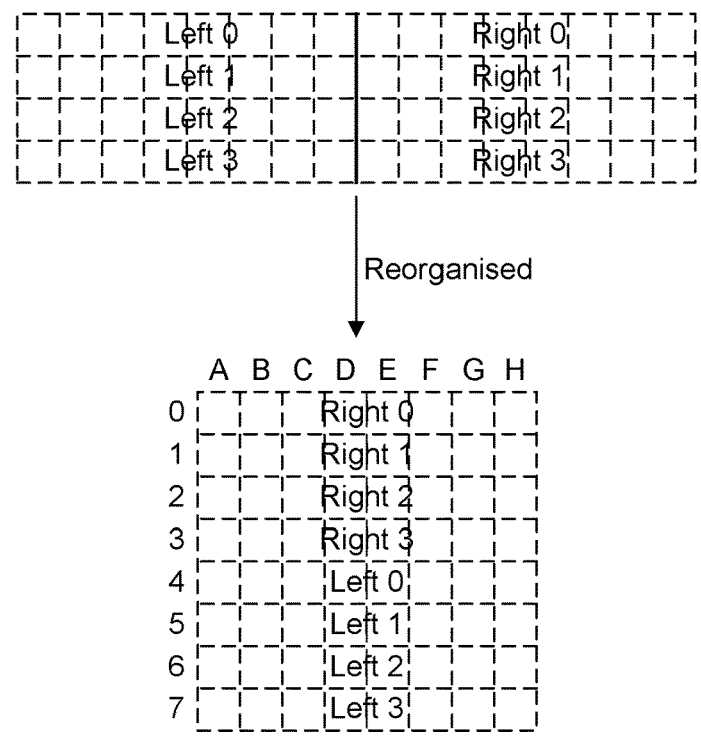
FIG. 24 illustrates how a 16×4 block of data values can be reorganised into an 8×8 block.

The example of a 16×4 block, with the input data being reorganised into an 8×8 arrangement, is shown in FIG. 24. It is noted that in other embodiments, different reorganisations may be implemented. The reorganisation is performed prior to spatial decorrelation. The reorganisation is performed by processing logic which may be included in the spatial decorrelation module, or in a separate unit which operates prior to the spatial decorrelation module in the pipelined operation of the data compression unit. In the example shown in FIG. 24, the right hand half of the 16×4 block is logically addressed as the first four rows, and the left half as the latter rows. This reorganised 8×8 block can be processed in a very similar way to the 8×8 blocks described above, except there are some modifications which can be made to the spatial decorrelation/spatial recorrelation to improve the compression results, based on the fact that we know that the left rows are positioned adjacent to the corresponding right rows. In this way, the system aims to utilise the likely spatial coherence between pixels in the block.

Figure 25:
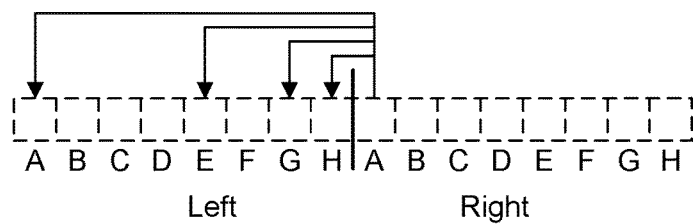
FIG. 25 illustrates that one of the data values in a right half of a row can be used for the prediction of some of the data values in a left half of the row.

The spatial decorrelation of the right rows is performed before the spatial decorrelation of the left rows. The spatial decorrelation of the right rows is performed in the same manner as described above for the first four rows of a standard 8×8 block. However, the values of column A of the right rows are saved (e.g. in a register) for use in the spatial decorrelation of the left rows. For the left rows, the data values in columns B, C, D and F are spatially decorrelated as described above in relation to standard 8×8 blocks. However, the data values in columns E, G and H of the left rows are no longer computed with just a Haar wavelet (i.e. one in which there is just one (repeated) reference value), but are instead computed using the Linear prediction method described above which uses two reference values. One of the reference values is the original reference value as described above in relation to the Haar predictions, but now, as shown in FIG. 25, the other one of the references is the data value from column A of the corresponding Right row. Furthermore, column A of the left rows is also made to depend on column A of the corresponding right row, using a Haar prediction.

Multiplexers can be added to the spatial decorrelation hardware shown in FIG. 6 to allow different inputs to be provided to the A, E, G and H pipelines based on whether a left row or a right row is currently being processed.

Figures 26, 27:
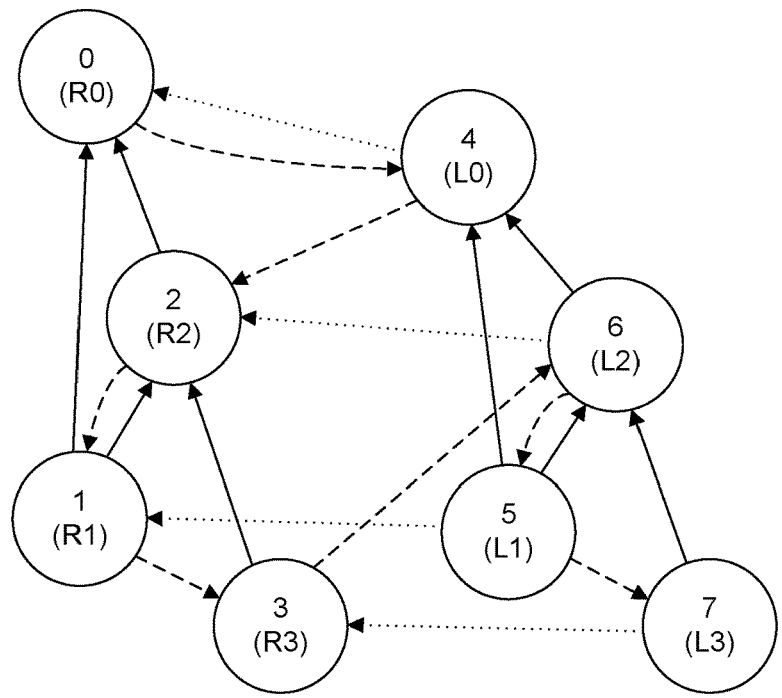
FIG. 26 shows a dependency tree for the order in which rows are processed in the spatial decorrelation process for a 16×4 block.
FIG. 27 is a table illustrating the order in which rows can be processed for a 16×4 block.

The vertical processing order is determined by the row dependencies shown in FIG. 26. The solid lines in FIG. 26 show the standard dependencies (similar to those shown in FIG. 10). The dotted lines in FIG. 26 show the dependencies of the left rows on their corresponding right rows. The dependencies on the corresponding right rows are more important in the decoder than in the encoder, but for clarity it is assumed that both encoder and decoder will use the same row processing order. The dashed lines in FIG. 26 show the order in which the rows are processed. The row order used for the 16×4 blocks is the same as the row order described above for the spatial decorrelation of 8×8 blocks. However, some of the operations that are performed are slightly different to the 8×8 blocks described above. In particular, rows 2 and 3 are now predicted using Haar predictions rather than Linear predictions; and row 4 is no longer predicted using either a Haar or a Linear prediction.

The spatial recorrelation is modified in accordance with the modifications made to the spatial decorrelation. The entropy encoding and decoding operates in the same manner for 16×4 blocks as for the 8×8 blocks described above.

Figure 28:
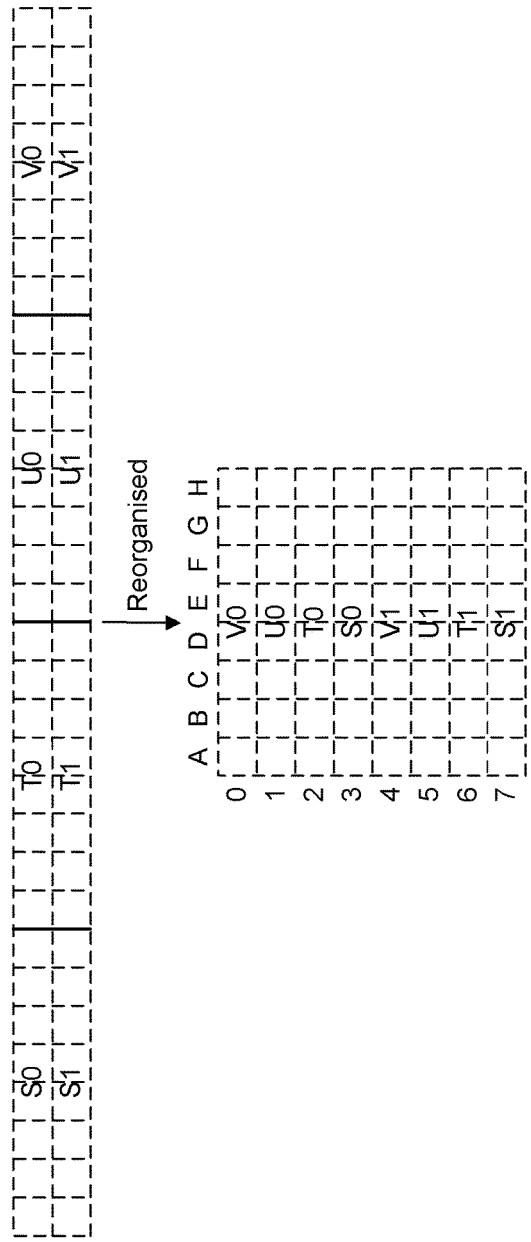
FIG. 28 illustrates how a 32×2 block of data values can be reorganised into an 8×8 block.

The example of a 32×2 block, with the input data being reorganised into an 8×8 arrangement, is shown in FIG. 28. It is noted that in other embodiments, different reorganisations may be implemented. In this example, each row of 32 data values is divided into four sections, labelled S, T, U and V in FIG. 28, each section having 8 data values. The four sections of the first row (S0, T0, U0 and V0) of the 32×2 block are logically addressed as the first four rows of an 8×8 block. The four sections of the second row (S1, T1, U1 and V1) of the 32×2 block are logically addressed as the latter four rows of the 8×8 block. This reorganised 8×8 block can be processed in a very similar way to the 8×8 blocks described above, except there are some modifications which can be made to the spatial decorrelation/spatial recorrelation to improve the compression results, based on the fact that we know the positioning of the different sections within the original 32×2 block. In this way, the system aims to utilise the likely spatial coherence between pixels in the block.

Figure 29:
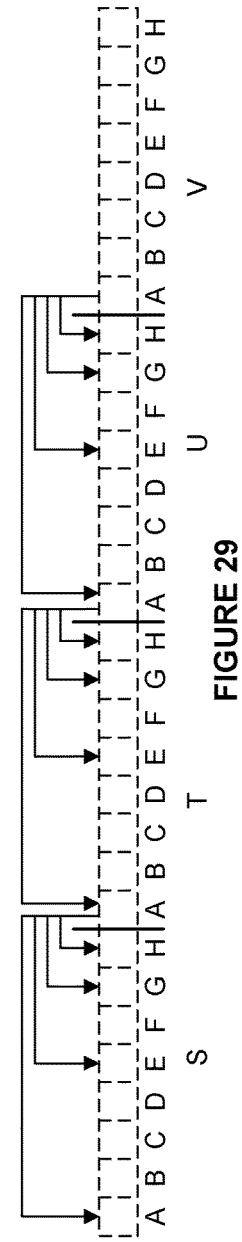
FIG. 29 illustrates that data values in some sections of a row can be used for the prediction of some of the data values in other sections of the row.

The spatial decorrelation of the rows is performed in sections from right to left, e.g. in the order V, U, T and then S. The spatial decorrelation of the V sections is performed in the same manner as described above for the rows of a standard 8×8 block. However, the value of column A of a V section is saved (e.g. in a register) for use in the spatial decorrelation of the U section of the same row. The spatial decorrelation of the U, T and S sections is performed in the same manner as described above for the left rows of a 16×4 block. For the U section, the data values in columns B, C, D and F are spatially decorrelated as described above in relation to standard 8×8 blocks. However, the data values in columns E, G and H of the U section are no longer computed with a Haar prediction, but are instead computed with a Linear prediction which uses two reference values. One of the reference values is the original reference value as described above in relation to the Haar predictions, but now, as shown in FIG. 29, the other one of the references is the data value from column A of the V section of the corresponding row. Furthermore, column A of the U section is made to depend on column A of the V section of the corresponding row, using a Haar prediction. The value of column A of the U section is saved (e.g. in a register) for use in the spatial decorrelation of the T section of the same row. For the T section, the data values in columns B, C, D and F are spatially decorrelated as described above in relation to standard 8×8 blocks. However, the data values in columns E, G and H of the T section are no longer computed with a Haar prediction, but are instead computed with a Linear prediction which uses two reference values. One of the reference values is the original reference value as described above in relation to the Haar predictions, but now, as shown in FIG. 29, the other one of the references is the data value from column A of the U section of the corresponding row. Furthermore, column A of the T section is made to depend on column A of the U section of the corresponding row, using a Haar prediction. The value of column A of the T section is saved (e.g. in a register) for use in the spatial decorrelation of the S section of the same row. For the S section, the data values in columns B, C, D and F are spatially decorrelated as described above in relation to standard 8×8 blocks. However, the data values in columns E, G and H of the U section are no longer computed with a Haar prediction, but are instead computed with a Linear prediction which uses two reference values. One of the reference values is the original reference value as described above in relation to the Haar predictions, but now, as shown in FIG. 29, the other one of the references is the data value from column A of the T section of the corresponding row. Furthermore, column A of the S section is made to depend on column A of the T section of the corresponding row, using a Haar prediction.

Multiplexers can be added to the spatial decorrelation hardware shown in FIG. 6 to allow different inputs to be provided to the A, E, G and H pipelines based on whether a V section or one of the S, T or U sections is currently being processed.

Figure 30:
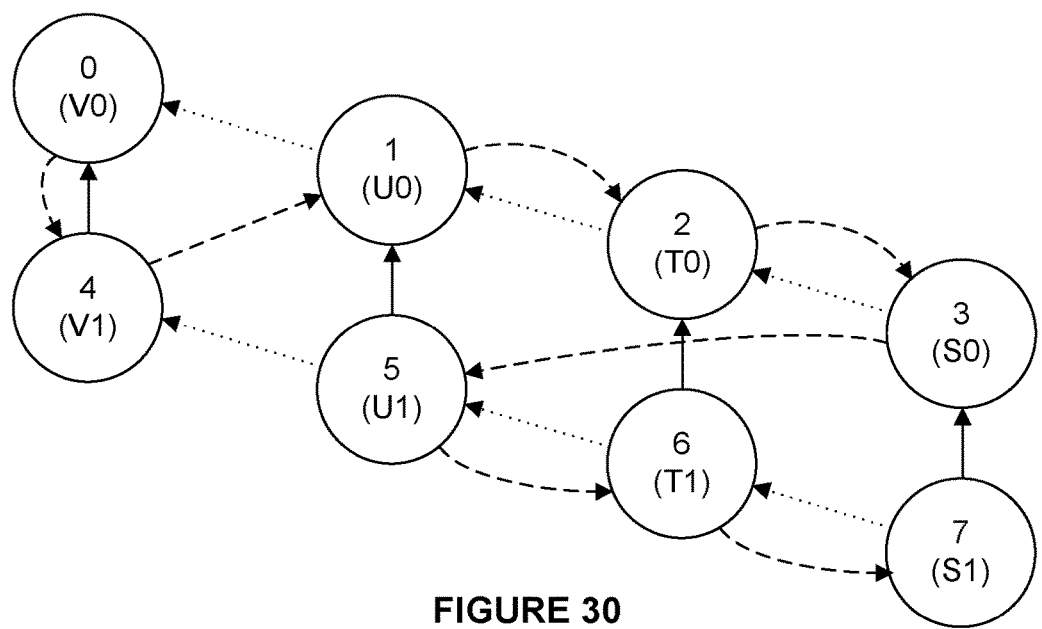
FIG. 30 shows a dependency tree for the order in which rows are processed in the spatial decorrelation process for a 32×2 block.
Figures 31, 32:
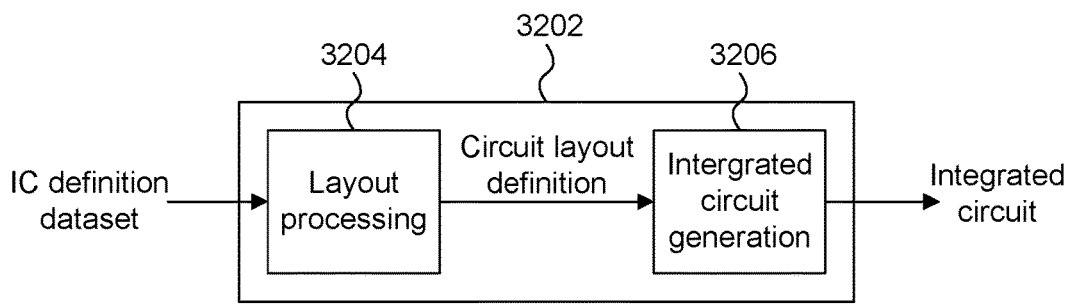
FIG. 31 is a table illustrating the order in which rows can be processed for a 32×2 block.
FIG. 32 shows an integrated circuit manufacturing system for generating an integrated circuit embodying a graphics processing system.

The vertical processing order is determined by the row dependencies shown in FIG. 30. The solid lines in FIG. 30 show the standard dependencies (similar to those shown in FIG. 10). The dotted lines in FIG. 30 show the dependencies of the sections on other sections of the corresponding row. The dependencies between sections of a row are more important in the decoder than in the encoder, but for clarity it is assumed that both encoder and decoder will use the same row processing order. The dashed lines in FIG. 30 show the order in which the rows of the reorganised block are processed. The row order shown in FIG. 30 for processing the rows for the 32×2 block is different to the order used for the 16×4 blocks and the 8×8 blocks described above. However, since there are fewer dependencies for the 32×2 block (compared to the 8×8 or 16×4 blocks described above) there is more freedom in choosing a row processing order. FIG. 31 shows the contents of the registers and the values on the left, centre and right inputs to the processing units in the second stage of the spatial decorrelation module. In this case, the rows 0, 1, 2 and 3 are not predicted using either a Haar or a Linear prediction; and rows 4, 5, 6 and 7 are predicted using a Haar prediction. None of the rows are predicted using a Linear prediction.

The spatial recorrelation is modified in accordance with the modifications made to the spatial decorrelation. The entropy encoding and decoding operates in the same manner for 32×2 blocks as for the 8×8 blocks described above.

It is noted that the above description of the "rows" and "columns" of the data block is not limiting in the sense that in other examples the columns of data blocks could be processed as the rows are processed in the examples described above, and the rows of data blocks could be processed as the columns are processed in the examples described above.

The components (e.g. data compression units, data decompression units, spatial decorrelation modules, entropy encoding modules, spatial recorrelation modules and entropy decoding modules) are shown in the figures and described herein as comprising a number of functional blocks. This is schematic only and is not intended to define a strict division between different logic elements of such entities. Each functional block may be provided in any suitable manner. It is to be understood that intermediate values described herein as being formed by a component need not be physically generated by the component at any point and may merely represent logical values which conveniently describe the processing performed by the component between its input and output.

The components (e.g. data compression units, data decompression units, spatial decorrelation modules, entropy encoding modules, spatial recorrelation modules and entropy decoding modules) described herein may be embodied in hardware on an integrated circuit. The components described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a component configured to perform any of the methods described herein, or to manufacture a component comprising any apparatus described herein. An integrated circuit definition dataset may be, for example, an integrated circuit description.

Therefore, there may be provided a method of manufacturing, at an integrated circuit manufacturing system, a component as described herein. Furthermore, there may be provided an integrated circuit definition dataset that, when processed in an integrated circuit manufacturing system, causes the method of manufacturing a component to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a component (e.g. a data compression unit, a data decompression unit, a spatial decorrelation module, an entropy encoding module, a spatial recorrelation modules or an entropy decoding module) will now be described with respect to FIG. 32.

FIG. 32 shows an example of an integrated circuit (IC) manufacturing system 3202 which is configured to manufacture a component as described in any of the examples herein. In particular, the IC manufacturing system 3202 comprises a layout processing system 3204 and an integrated circuit generation system 3206. The IC manufacturing system 3202 is configured to receive an IC definition dataset (e.g. defining a component as described in any of the examples herein), process the IC definition dataset, and generate an IC according to the IC definition dataset (e.g. which embodies a component as described in any of the examples herein). The processing of the IC definition dataset configures the IC manufacturing system 3202 to manufacture an integrated circuit embodying a component as described in any of the examples herein.

The layout processing system 3204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 3204 has determined the circuit layout it may output a circuit layout definition to the IC generation system 3206. A circuit layout definition may be, for example, a circuit layout description.

The IC generation system 3206 generates an IC according to the circuit layout definition, as is known in the art. For example, the IC generation system 3206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 3206 may be in the form of computer-readable code which the IC generation system 3206 can use to form a suitable mask for use in generating an IC.

The different processes performed by the IC manufacturing system 3202 may be implemented all in one location, e.g. by one party. Alternatively, the IC manufacturing system 3202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a component without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 32 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 32, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A data compression method comprising performing spatial decorrelation on a j×k input block of data values using a spatial decorrelation module which is arranged to process g×h blocks of data values, wherein the number of columns, j, in the input block of data values is a multiple of g, and wherein j×k=g×h, the method comprising:
   reorganising the input block of data values into a g×h block of data values by: (i) dividing each of the rows of the input block into a plurality sections, wherein each section comprises g data values, and (ii) arranging the sections into h rows to form a g×h block of data values;
   performing spatial decorrelation on the g×h block of data values to determine spatially decorrelated data values, wherein the rows of the g×h block of data values are processed in an order such that, for each row of the input block of data values, a first section of that row is processed in an earlier iteration to that in which a second section of that row is processed, wherein the first section is to the right of the second section in the row, and wherein at least one value from the first section is saved for use in the spatial decorrelation of the second section; and
   providing the spatially decorrelated data values to an entropy encoding module for entropy encoding.

2. The method of claim 1, wherein a data value from column A of the first section is saved, and used to compute the spatially decorrelated data values in columns E, G and H of the second section using a Linear prediction method which uses two reference values.

3. The method of claim 1, wherein a data value from column A of the first section is saved, and used to compute a spatially decorrelated data value in column A of the second section using a Haar prediction method which uses one reference value.

4. A data compression unit configured to perform spatial decorrelation on a j×k input block of data values, the data compression unit comprising:
   processing logic configured to reorganise the input block of data values into a g×h block of data values by: (i) dividing each of the rows of the input block into a plurality sections, wherein each section comprises g data values, and (ii) arranging the sections into h rows to form a g×h block of data values, wherein the number of columns, j, in the input block of data values is a multiple of g, and wherein j×k=g×h;
   a spatial decorrelation module configured to perform spatial decorrelation on the g×h block of data values to determine spatially decorrelated data values, the h rows of the g×h block of data values being processed in an order such that, for each row of the input block of data values, a first section of that row is processed in an earlier iteration to that in which a second section of that row is processed, wherein the first section is to the right of the second section in the row, and wherein at least one value from the first section is saved for use in the spatial decorrelation of the second section; and
   an entropy encoding module, wherein the spatial decorrelation module is configured to provide the spatially decorrelated data values to the entropy encoding module for entropy encoding.

5. The data compression unit of claim 4, wherein the processing logic is part of the spatial decorrelation module.

6. The data compression unit of claim 4, wherein the processing logic is outside of the spatial decorrelation module.

7. The data compression unit of claim 4, wherein g=h=8, such that the g×h block of data values is an 8×8 block of data values.

8. The data compression unit of claim 7, wherein j=16 and k=4, such that the processing logic is configured to divide each of the rows of the input block into two sections.

9. The data compression unit of claim 7, wherein j=32 and k=2, such that the processing logic is configured to divide each of the rows of the input block into four sections.

10. The data compression unit of claim 4, wherein the spatial decorrelation module is further configured to remap the data values subsequent to said spatial decorrelation but prior to providing the spatially decorrelated data values to the entropy encoding module, such that the entropy encoding is performed on the remapped data values.

11. The data compression unit of claim 10, wherein the remapped data values are unsigned, with a distribution which is biased towards zero.

12. A data decompression method comprising performing spatial recorrelation on a g×h input block of data values and outputting a j×k output block of spatially recorrelated data values, wherein the number of columns, j, in the output block of data values is a multiple of g, wherein j×k=g×h, and wherein j≠g, the method comprising:
   receiving the data values of the input data block from an entropy decoding module which has applied entropy decoding to the data values;
   performing spatial recorrelation on the g×h input block of data values, wherein the rows of the g×h input block of data values correspond to sections of rows of the j×k output block of data values, and wherein the rows of the input block of data values are processed in an order such that a first row of the input block of data values corresponding to a first section of a particular row of the output block is processed in an earlier iteration to that in which a second row of the input block of data values corresponding to a second section of the particular row of the output block is processed, wherein the first section is to the right of the second section in the particular row of the output block, and wherein at least one value from the first row of the input block of data values is saved for use in the spatial recorrelation of the second row of the input block of data values;
   reorganising the spatially recorrelated data values into the j×k output block of spatially recorrelated data values by arranging the rows of spatially recorrelated data values into their corresponding sections in the k rows of the output block; and
   outputting the j×k output block of spatially recorrelated data values.

13. The method of claim 12, wherein a data value from column A of the first row of the input block is saved, and used to compute the spatially recorrelated data values in columns E, G and H of the second row of the input block based on a Linear prediction method which uses two reference values.

14. The method of claim 12, wherein a data value from column A of the first row of the input block is saved, and used to compute a spatially recorrelated data value in column A of the second row of the input block based on a Haar prediction method which uses one reference value.

15. A data decompression unit comprising:
an entropy decoding module;
a spatial recorrelation module configured to perform spatial recorrelation on a g×h input block of data values to determine a j×k output block of spatially recorrelated data values, wherein the number of columns, j, in the output block of data values is a multiple of g, wherein j×k=g×h, and wherein j≠g, wherein the rows of the g×h input block of data values correspond to sections of rows of the j×k output block of data values, and wherein the spatial recorrelation module is configured to: (i) receive the data values of the input data block from the entropy decoding module which has applied entropy decoding to the data values, and (ii) process the rows of the input block of data values in an order such that a first row of the input block of data values corresponding to a first section of a particular row of the output block is processed in an earlier iteration to that in which a second row of the input block of data values corresponding to a second section of the particular row of the output block is processed, wherein the first section is to the right of the second section in the particular row of the output block, wherein the spatial recorrelation module is configured to save at least one value from the first row of the input block of data values for use in the spatial recorrelation of the second row of the input block of data values; and
processing logic configured to reorganise the spatially recorrelated data values into the j×k output block of spatially recorrelated data values by arranging the rows of spatially recorrelated data values into their corresponding sections in the k rows of the output block.

16. The data decompression unit of claim 15, wherein the processing logic is part of the spatial recorrelation module.

17. The data decompression unit of claim 15, wherein the processing logic is outside of the spatial recorrelation module.

18. The data decompression unit of claim 15, wherein g=h=8, such that the g×h input block of data values is an 8×8 input block of data values.

19. The data decompression unit of claim 18, wherein j=16 and k=4, such that each of the rows of the output block comprises two sections.

20. The data decompression unit of claim 18, wherein j=32 and k=2, such that each of the rows of the output block comprises four sections.

* * * * *